(12) United States Patent
Bichler

(10) Patent No.: US 11,055,608 B2
(45) Date of Patent: Jul. 6, 2021

(54) CONVOLUTIONAL NEURAL NETWORK

(71) Applicant: COMMISSARIAT A L'ENERGIE ATOMIQUE ET AUX ENERGIES ALTERNATIVES, Paris (FR)

(72) Inventor: Olivier Bichler, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 783 days.

(21) Appl. No.: 15/505,231

(22) PCT Filed: Aug. 18, 2015

(86) PCT No.: PCT/EP2015/068955
§ 371 (c)(1),
(2) Date: Feb. 20, 2017

(87) PCT Pub. No.: WO2016/030230
PCT Pub. Date: Mar. 3, 2016

(65) Prior Publication Data
US 2017/0200078 A1    Jul. 13, 2017

(30) Foreign Application Priority Data

Aug. 28, 2014  (FR) ..................... 1458088

(51) Int. Cl.
*G06N 3/063* (2006.01)
*G06N 3/04* (2006.01)

(52) U.S. Cl.
CPC ............ *G06N 3/063* (2013.01); *G06N 3/049* (2013.01)

(58) Field of Classification Search
CPC ..................................................... G06N 3/049
See application file for complete search history.

(56) References Cited

U.S. PATENT DOCUMENTS 6,999,953 B2 *   2/2006  Ovhsinsky ........... G06N 3/0635
                                                  706/39
9,269,042 B2 *   2/2016  Friedman ............... G06N 3/049
(Continued)

OTHER PUBLICATIONS

Serrano-Gotarredona et al, "A proposal for hybrid memristor-CMOS spiking neuromorphic learning systems", 2013, IEEE Circuits Systems Magazine, 13, pp. 74-88. (Year: 2013).*
(Continued)

*Primary Examiner* — Michael J Huntley
*Assistant Examiner* — Clint Mullinax
(74) *Attorney, Agent, or Firm* — BakerHostetler

(57) ABSTRACT

A convolutional neural network is provided comprising artificial neurons arranged in layers, each comprising output matrices. An output matrix comprises output neurons and is connected to an input matrix, comprising input neurons, by synapses associated with a convolution matrix comprising weight coefficients associated with the output neurons of an output matrix. Each synapse consists of a set of memristive devices storing a weight coefficient of the convolution matrix. In response to a change of the output value of an input neuron, the neural network dynamically associates each set of memristive devices with an output neuron connected to the input neuron. The neural network comprises accumulator(s) for each output neuron; to accumulate the values of the weight coefficients stored in the sets of memristive devices dynamically associated with the output neuron, the output value of the output neuron being determined from the value accumulated in the accumulator(s).

14 Claims, 21 Drawing Sheets

(56) References Cited

U.S. PATENT DOCUMENTS

| | | | | |
|---|---|---|---|---|
| 9,269,043 | B2* | 2/2016 | Nugent | G06N 3/049 |
| 10,140,573 | B2* | 11/2018 | Julian | G06N 3/082 |
| 2014/0355861 | A1* | 12/2014 | Nirenberg | H04N 19/85 |
| | | | | 382/133 |
| 2015/0306761 | A1* | 10/2015 | O'Connor | G06N 3/008 |
| | | | | 700/250 |
| 2015/0339589 | A1* | 11/2015 | Fisher | B25J 9/16 |
| | | | | 706/12 |

OTHER PUBLICATIONS

Taha et al, "Exploring the design of specialized multicore neural processors", 2013, Proceedings of the 2013 International Joint Conference on Neural Networks, all pages. (Year: 2013).*

Ramasubramanian et al, "SPINDLE: SPINtronic deep learning engine for large-scale neuromorphic computing", Aug. 11, 2014, Proceedings of the 2014 International Symposium on Low Power Electronics and Design, pp. 15-20. (Year: 2014).*

Luis Camunas-Mesa et al., "An Event-Driven Multi-Kernel Convolution Processor Module for Event-Driven Vision Sensors," IEEE Journal of Solid-State Circuits, vol. 47, No. 2, Feb. 2012, pp. 504-517.

T. Serrano-Gotarredona et al., "A proposal for hybrid memristor-CMOS spiking neuromorphic learning systems," IEEE Circuits and Systems Magazine, vol. 13, No. 2, May 22, 2013, pp. 74-88, XP011510883.

S.G. Ramasubramanian et al., "SPINDLE: SPINtronic Deep Learning Engine for large-scale neuromorphic computing," Proceedings of the 2014 International Symposium on Low Power Electronics and Design, Aug. 11, 2014, pp. 15-20, XP058053992.

T. M. Taha et al., "Exploring the design space of specialized multicore neural processors," Proceedings of the 2013 International Joint Conference on Neural Networks, Aug. 4, 2013, XP032542398.

D. Roclin et al., "Spiking neural network for embedded image sensors," Leti/List Annual Research Report 2013, Jun. 12, 2014, pp. 93, XP055196597.

D. Garbin et al., "Variability-tolerant convolutional neural network for pattern recognition applications based on OxRAM synapses," Proceedings of the 2014 IEEE International Electron Devices Meeting, Dec. 15, 2014, XP032737945.

Yann LeCun et al., "Gradient-Based Learning Applied to Document Recognition," Proceedings of the IEEE, vol. 86, No. 11, pp. 2278-2324, Nov. 1998.

P. Simard et al., "Best practices for convolutional neural networks applied to visual document analysis," Proceedings of the Seventh International Conference on Document Analysis and Recognition, 2003, pp. 958-963.

D. C. Ciresan et al., "Flexible, high performance convolutional neural networks for image classification," Proceedings of the Twenty-Second International Joint Conference on Artificial Intelligence, vol. Two, 2011, pp. 1237-1242.

Q. V. Le et al., "Building high-level features using large scale unsupervised learning," In International Conference on Machine Learning, 2012.

A. Krizhevsky et al., "Imagenet classification with deep convolutional neural networks," In Advances in Neural Information Processing Systems 25, 2012, pp. 1097-1105.

J. Perez-Carrasco et al., "Mapping from frame-driven to frame-free event-driven vision systems by low-rate rate coding and coincidence processing-application to feed-forward ConvNets," IEEE Transactions on Pattern Analysis and Machine Intelligence, vol. 35, No. 11, pp. 2706-2719, 2013.

K. Fukushima, "Neocognitron: A self-organizing neural network model for a mechanism of pattern recognition unaffected by shift in position," Biological Cybernetics, vol. 36, No. 4, pp. 193-202, 1980.

* cited by examiner

CONVOLUTIONAL NEURAL NETWORK

CROSS-REFERENCE TO RELATED APPLICATIONS

This application is a National Stage of International patent application PCT/EP2015/068955, filed on Aug. 18, 2015, which claims priority to foreign French patent application No. FR 1458088, filed on Aug. 28, 2014, the disclosures of which are incorporated by reference in their entirety.

TECHNICAL FIELD

The invention relates generally to artificial neural networks and in particular to the implementation of convolutional neural networks in the form of electronic circuits from memristive devices.

PRIOR ART BACKGROUND

Artificial neural networks are schematically inspired by the biological neural networks whose operation they mimic. The artificial neural networks are composed essentially of neurons interconnected together by synapses, which are conventionally implemented by digital memories, but which can also be implemented by resistive components whose conductance varies as a function of the voltage applied to their terminals. The artificial neural networks are used in various signal processing fields (visual, sound, or the like) such as, for example, in the field of image classification or recognition.

The convolutional neural networks correspond to a particular mode of artificial neural network. The convolutional neural networks were described for the first time in the article by K. Fukushima, "Neocognitron: A self-organizing neural network model for a mechanism of pattern recognition unaffected by shift in position. *Biological Cybernetics*, 36(4):193-202, 1980. ISSN 0340-1200. doi: 10.1007/BF00344251".

Many developments relating to the neural networks have been proposed, such as, for example, in the articles:

Y. LeCun, L. Bottou, Y. Bengio, and P. Haffner, "Gradient-based learning applied to document recognition. *Proceedings of the IEEE*, 86(11):2278-2324, 1998. ISSN 0018-9219. doi: 10.1109/5.726791.", and P. Simard, D. Steinkraus, and J. C. Platt, "Best practices for convolutional neural networks applied to visual document analysis. *Document Analysis and Recognition*, 2003. *Proceedings. Seventh International Conference on*, pages 958-963, 2003. doi: 10.1109/ICDAR.2003. 1227801".

The convolutional neural networks (or "deep (convolutional) neural networks", or even "ConvNets") are feed forward neural networks, inspired by biological visual systems. When applied to image recognition, these networks allow for a learning of the intermediate representations of objects in the images which are smaller and which can be generalized for similar objects, which facilitates the recognition thereof. Such a network can be made up of several convolution layers, including or not including pooling layers and which are generally followed by a multilayer perceptron-type classifier, the output of one layer being connected to the input of the next.

In a convolution layer, each neuron is connected to a sub-matrix of the input matrix. The sub-matrices have the same size. They are offset from one another regularly and can overlap. The input matrix can be of any dimension. However, the input matrix is generally of 2D dimension when the data to be processed are visual data, the two dimensions then corresponding to the spatial dimensions X and Y of an image.

The neurons are connected to their input sub-matrix/by synapses whose weight can be set. The matrix K of the synaptic weights applied to input sub-matrices of the neurons is the same for all the neurons of one and the same output map (or "feature map"). Such a matrix K is also called "convolution kernel". The fact that the convolution kernel is shared for all the neurons of one and the same output map O, and therefore applied to all of the input matrix, reduces the memory needed for the storage of the coefficients, which optimizes the performance levels. For example, for image recognition, that makes it possible to minimize the number of filters or of intermediate representations which best code the features of the image and which can be reused over all the image. The coefficients of a convolution kernel K (that is to say the synaptic weights) can correspond to conventional signal processing filters (Gaussien, Gabor, Laplace, etc.), or be determined by learning, supervised or unsupervised, for example by using the gradient backpropagation algorithm used in the neural networks of multilayer perceptron type. The coefficients of the convolution kernels can be positive or negative, and are generally normalized between −1 and 1, just like the input and output values of the neurons.

A neuron initially produces the weighted sum h of the coefficients of its input sub-matrix by the convolution kernel (in other words, the scalar product between the input sub-matrix I and the matrix K), by applying the aggregation function $g=<I,W>$. The output of the neuron corresponds to the value of the activation function g of the neuron applied to this sum: g(h). Conventionally, g can take the form of a sigmoid function, typically the hyperbolic tangent function.

A convolution layer can contain one or more convolution kernels, which each have an input matrix, which can be the same, but which have different coefficients corresponding to different filters.

Each convolution kernel in a layer produces a different output map such that the output neurons are different for each kernel. The convolutional networks can also include local or global "pooling" layers which combine the neuron group outputs of one or more output maps. The combination of the outputs can consist, for example, in taking the maximum or average value of the outputs of the group of neurons, for the corresponding output, on the output map of the "pooling" layer. The "pooling" layers make it possible to reduce the size of the output maps from one layer to the other in the network, while improving the performance levels thereof by making it more tolerant to small deformations or translations in the input data.

The convolutional networks can also include fully connected layers of perceptron type.

FIG. 1 represents an example of a simple convolutional network, with an input layer "env" corresponding to the input matrix, two convolution layers, "conv1" and "conv2", and two fully connected layers "fc1" and "fc2". In this example, the size of the convolution kernels is 5×5 pixels and they are offset from one another by 2 pixels (i.e. an offset or "stride" of 2):

"conv1" has one input matrix "env" and 6 different convolution kernels producing 6 output maps;

"conv2" has 12 different convolution kernels and therefore 12 output maps, and each output map takes as input the set of the 6 output maps of the preceding layer.

There are solutions consisting in implementing the neural networks on graphics processor GPU to significantly improve the performance levels thereof, like the solution described in the article by D. C. Ciresan, U. Meier, J. Masci, L. M. Gambardella, and J. Schmidhuber, "Flexible, high performance convolutional neural networks for image classification. Proceedings of the Twenty-Second International Joint Conference on Artificial Intelligence—Volume Two>>, IJCAI' 11, pages 1237-1242, 2011. ISBN 978-1-57735-514-4. doi: 10.5591/978-1-57735-516-8/IJCAI11-210.

An important feature of the neural networks is their scaling. In effect, the neural networks remain effective regardless of the size of the image base to be learned, as described in:

Q. V. Le, R. Monga, M. Devin, K. Chen, G. S. Corrado, J. Dean, and A. Y. Ng. Building high-level features using large scale unsupervised learning, In *International Conference on Machine Learning*, 2012;

A. Krizhevsky, I. Sutskever, and G. E. Hinton. Imagenet classification with deep convolutional neural networks. In *Advances in Neural Information Processing Systems* 25, pages 1097-1105. Curran Associates, Inc., 2012.

In their conventional version, the elements that make up the input matrix and the output maps are numbers, integers or decimals, with fixed or floating point. Thus, the operation of convolution between an input sub-matrix and an output neuron corresponds to the scalar product between the input sub-matrix I and the matrix K. In a so-called "spike" version, the input and output values are coded with spikes. A value can thus be coded by the number of spikes during a fixed time window (frequency coding), or by the instant of emission of a spike according to a rank order coding technique.

In the case of a frequency coding, the calculation of the weighted sum h is done by accumulation of the coefficient of the convolution kernel on each arrival of a spike on the corresponding input. The activation function of the neuron g can in this case be replaced by a threshold. When the absolute value of h exceeds the threshold following the arrival of a spike on the input sub-matrix, the output neuron emits a spike of the sign of h and re-emits h with the value 0. The neuron then enters into a so-called "refractory" period during which it can no longer emit a spike for a set period. The spikes can consequently be positive or negative, depending on the sign of h at the time of the threshold overshoot. A negative spike at the input reverses the sign of the coefficient of the corresponding kernel for the accumulation. An equivalence between conventional version and spike version is shown in J. Perez-Carrasco, B. Zhao, C. Serrano, B. Acha, T. Serrano-Gotarredona, S. Chen, and B. Linares-Barranco. Mapping from frame-driven to frame-free event-driven vision systems by low-rate rate coding and coincidence processing—application to feedforward convnets. *Pattern Analysis and Machine Intelligence, IEEE Transactions on*, 35(11):2706-2719, 2013. ISSN 0162-8828. doi: 10.1109/TPAMI.2013.71.

A physical implementation of spike convolutional network was in particular proposed in L. Camunas-Mesa, C. Zamarreno-Ramos, A. Linares-Barranco, A. Acosta-Jimenez, T. Serrano-Gotarredona, and B. Linares-Barranco. An event-driven multi-kernel convolution processor module for event-driven vision sensors. *Solid-State Circuits, IEEE Journal of*, 47(2):504-517, 2012. ISSN 0018-9200. doi: 10.1109/JSSC.2011.2167409. Such a convolution implementation uses a separate digital memory to store the coefficients of the convolution kernels and entails copying these coefficients from the kernel of the memory to the computation unit (ALU) on each spike arrival.

Thus, the existing solutions all require a computation unit for the convolution computation. Moreover, such solutions are limited by the size of the data bus of the digital memories and initially require a recovery of the value stored in the memory before being able to perform an operation thereon. Thus, for example, if the size of the memory bus is 64 bits and the coefficients are stored on 8 bits, it is possible to recover, on each clock spike, only 8 coefficients. Millions of clock cycles may therefore be necessary depending on the number of coefficients in the network. The result thereof is a significant processing time, and a significant consumption of energy to calculate all the outputs of the network for an input datum. Such a situation constitutes a bottleneck fundamental to this type of architecture (also called Von Neumann bottleneck). Such a bottleneck can at most be limited (but not eliminated) by the use of instructions of SIMD (Single Instruction on Multiple Data) type to process several data in one processor instruction and by the use of distributed memory with several computation units as in the graphic processors GPU.

GENERAL DESCRIPTION OF THE INVENTION

The invention improves the situation. To this end, it proposes a convolutional neural network comprising a plurality of artificial neurons arranged in one or more convolution layers. Each convolution layer comprising one or more output matrices, each output matrix comprising a set of output neurons. Each output matrix is connected to an input matrix, which comprises a set of input neurons, by artificial synapses associated with a convolution matrix comprising the synaptic weight coefficients associated with the output neurons of the output matrix. The output value of each output neuron is determined from the input neurons of the input matrix to which the output neuron is connected and the synaptic weight coefficients of the convolution matrix associated with the output matrix. Each synapse consists of a set of memristive devices comprising at least one memristive device, each set of memristive devices storing a coefficient of said convolution matrix. In response to a change of state of an input neuron of an input matrix, the neural network is capable of:

dynamically interconnecting each set of memristive devices storing the coefficients of the weight matrix to the output neurons connected to the input neuron, and for each output neuron, accumulating the values of the weight coefficients stored in the sets of memristive devices dynamically interconnected with the output neuron in an output accumulator, which supplies the output value of the output neuron.

According to one embodiment, the neurons can use a time coding, the dynamic mapping being implemented in response to the triggering of an input neuron of the input matrix.

In response to the dynamic mapping, the accumulation of the values of the weight coefficients can then be implemented by propagation of at least one spike coding the value of each weight coefficient, according to the time coding, the values accumulated in the output accumulators constituting the output values of the output matrix.

The neural network can comprise a set of switches and a logic circuit mapping the synaptic weight coefficients with the output neurons connected to the input neuron having undergone a change of state, from the address of the input neuron in the input matrix, to produce the dynamic mapping.

Each spike can comprise a bitstream coding the destination address (X, Y) of the spike according to two right-angled axes X and Y, the reference point (X, Y) corresponding to the reference point of the input matrix; when said spike arrives on the input matrix, the coded address (X, Y) represents the location of the input neuron to be activated.

According to one embodiment, the dynamic mapping can be produced in parallel and in a single cycle, by simultaneously connecting the set of the weight coefficients stored in the memristive devices to the output neurons connected to the input neuron having undergone a change of state.

According to another embodiment, the dynamic mapping can be produced semi-sequentially, by connecting the coefficients of the weight matrix stored in the memristive devices, one row of the matrix after the other, to the output neurons connected to the input neuron having undergone a change of state.

As a variant, the dynamic mapping can be produced semi-sequentially, by connecting the coefficients of the weight matrix stored in the memristive devices, one column of the matrix after the other, to the output neurons connected to the input neuron having undergone a change of state.

In yet another variant, the dynamic mapping can be produced sequentially, by connecting the coefficients of the convolution matrix, stored in said memristive devices, one after the other, to the output neurons connected to the input neuron having undergone a change of state.

According to one feature, the neural network can comprise an accumulator arranged at the output of each synapse, the accumulator producing the accumulation of the value of the weight coefficient stored in the memristive devices of the synapse with the value stored in the accumulator of the corresponding output neuron, the value stored in the auxiliary accumulator then being propagated by the spikes in the accumulator of the output matrix.

According to another feature, the neural network can comprise an accumulator arranged at each output neuron, the output of each memristive device of the synapse being propagated at the output neuron, the value thus propagated being accumulated with the value stored in the accumulator.

The outputs of neurons can be grouped together, while the accumulated values corresponding to grouped outputs are stored in a common accumulator.

According to yet another feature, the neural network can comprise online learning of STDP type from the dynamic mapping.

The embodiments proposed thus make it possible to do the convolution computation directly in the memory and in parallel, which improves the speed and energy efficiency of the operation.

BRIEF DESCRIPTION OF THE DRAWINGS

Other features and advantages of the invention will become apparent from the following description and the figures of the attached drawings in which.

DETAILED DESCRIPTION

Figure 1:
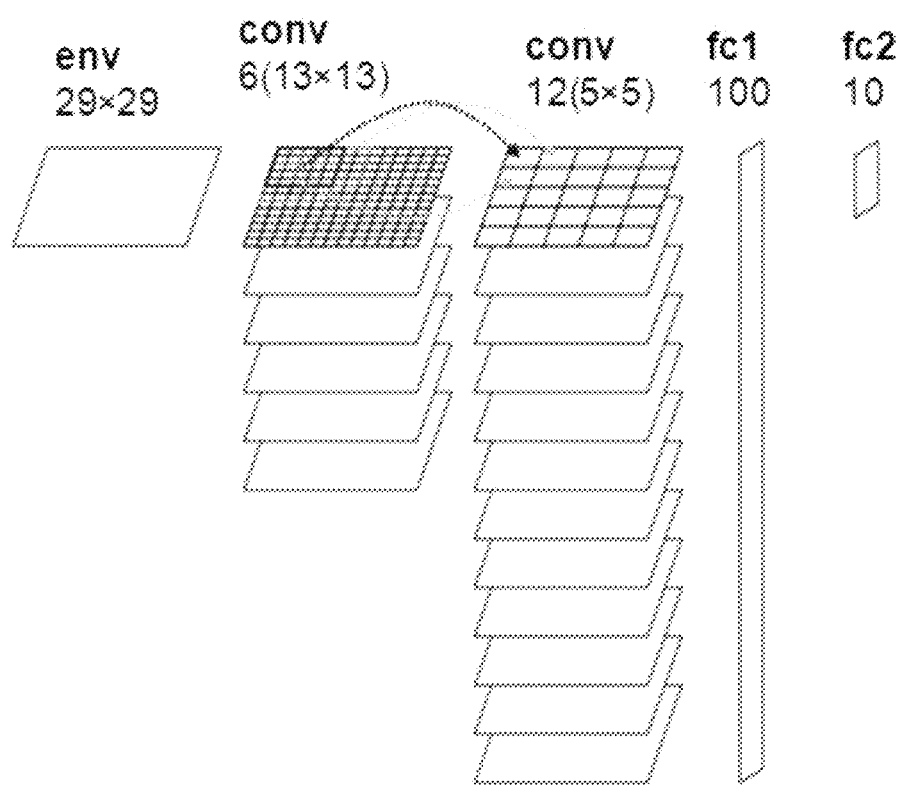
FIG. 1 represents an example of a simple three-layer convolutional network, and the output layer.
Figure 2:
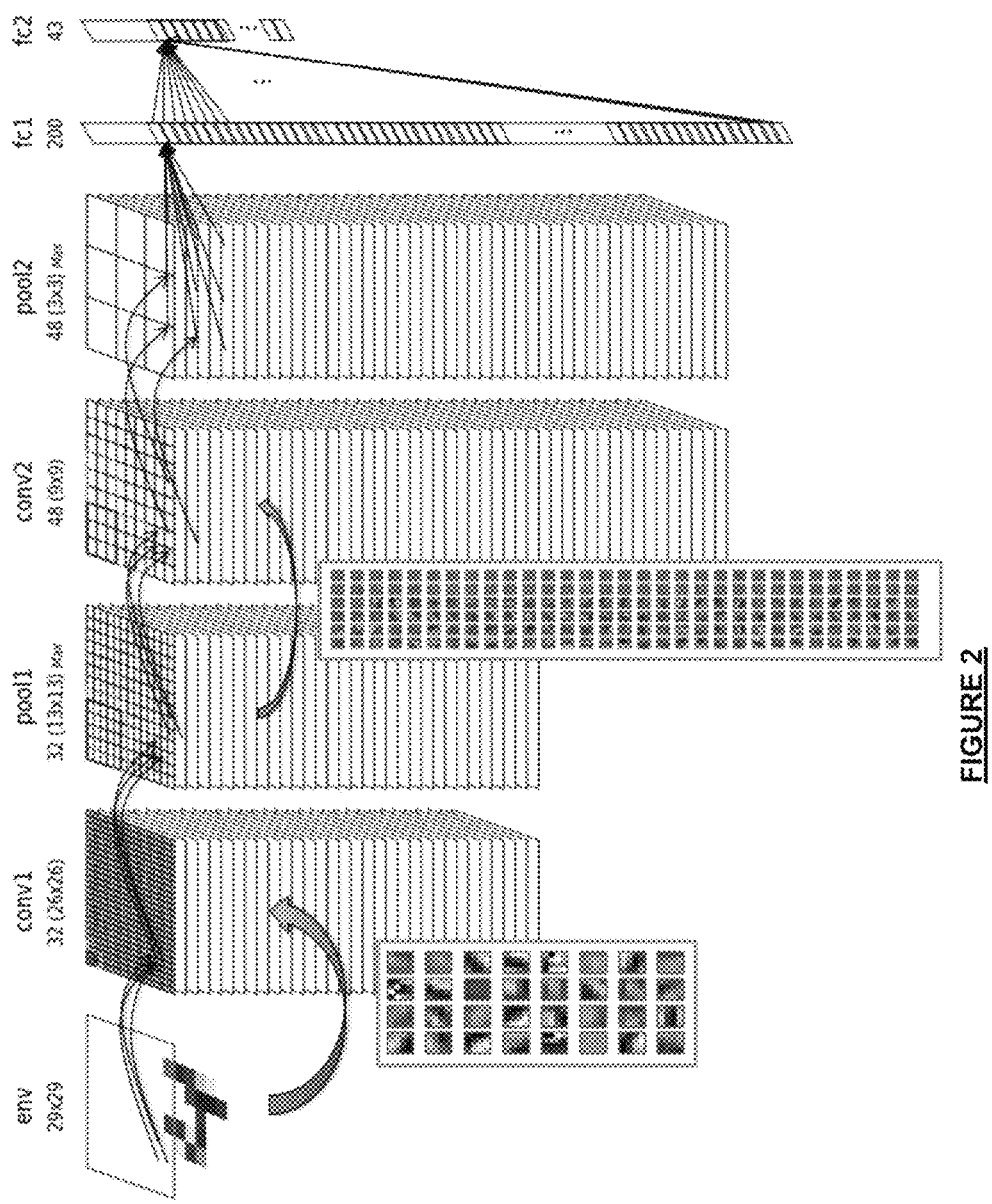
FIG. 2 represents an example of a complex convolutional network, including "pooling" layers.

FIG. 2 represents an example of a convolutional network including pooling layers for the classification of images. The images at the bottom of FIG. 2 represent an extract of the convolution kernels of the first layer, after a learning of gradient backpropagation type, on an image base such as ImageNet.

An artificial neural network (also called "formal" neural network or simply called "neural network" hereinbelow) consists of one or more layers of neurons, interconnected with one another. Each layer is made up of a set of neurons, which are connected to one or more preceding layers. Each neuron of one layer can be connected to one or more neurons of one or more preceding layers. The last layer of the network is called "output layer".

The neurons are connected together by synapses, or synaptic weights, which weight the efficiency of the connection between the neurons, constitute the adjustable parameters of a network and which store the information contained in the network. The synaptic weights can be positive or negative.

The so-called "convolutional" (or even "deep convolutional" or "convnets") neural networks are also composed of layers of particular types such as the convolution layers, the pooling layers and the fully connected layers. By definition, a convolutional neural network comprises at least one convolution or pooling layer.

Figure 3:
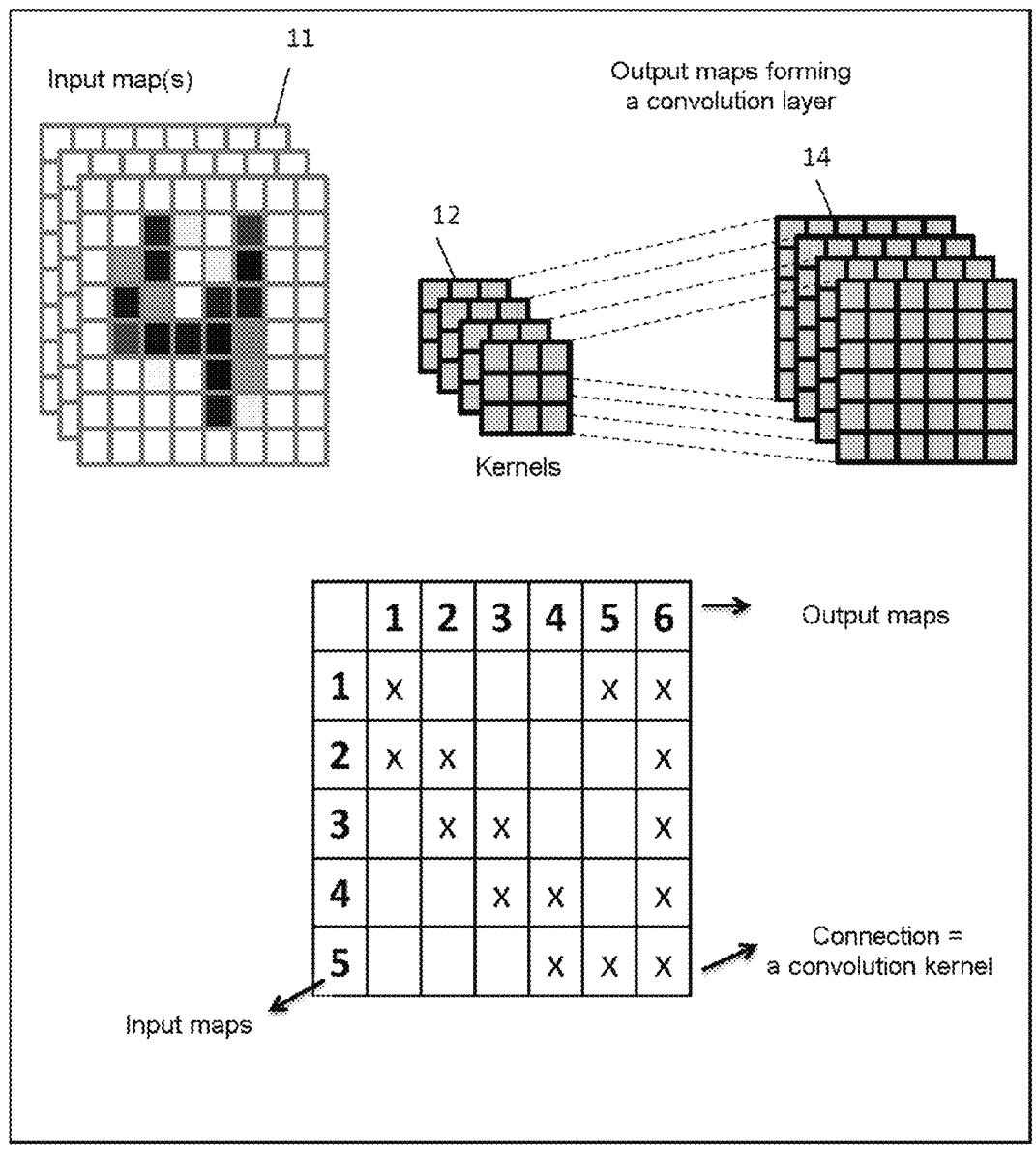
FIG. 3 is a diagram showing a convolution layer made up of several output maps/matrices.

As illustrated in FIG. 3, a convolution or pooling layer can be made up of one or more output matrices 14 (also called "output maps" or "output feature maps"), each output map being able to be connected to one or more input matrices 11 (also called "input maps").

Figure 4:
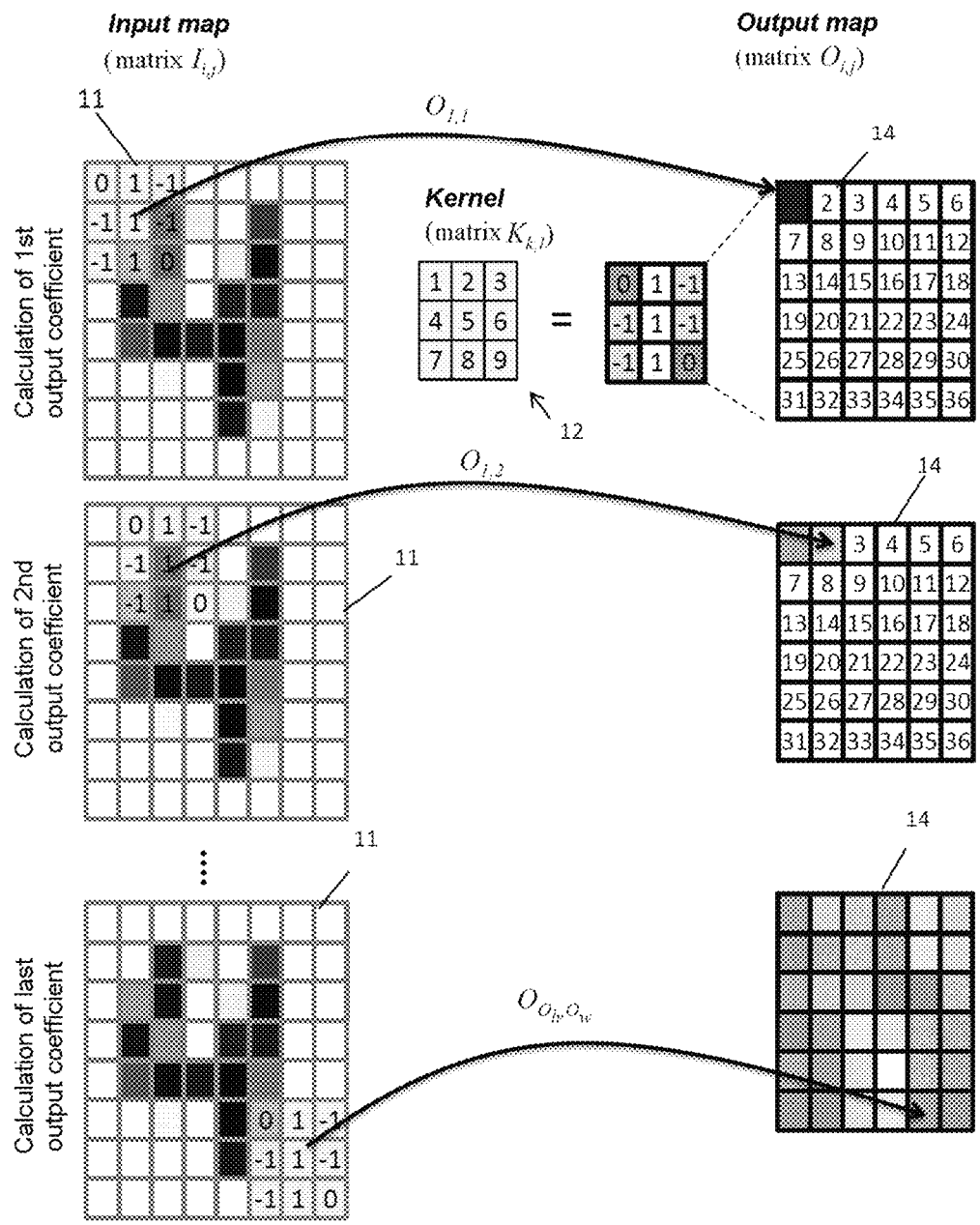
FIG. 4 illustrates the principle of operation of a convolutional layer in such a network.

As illustrated in FIG. 4, an output matrix denoted O comprises coefficients $O_{i,j}$, and has a size denoted $(O_h, O_w)$. This matrix corresponds to a matrix of neurons and the coefficients $O_{i,j}$ correspond to the output values of these neurons, calculated from the inputs and the synaptic weights.

The state of a neuron corresponds to its output value. A change of state of a neuron thus corresponds to a change of its output value. It should be noted that, in a spike embodiment, a change of state of a neuron (input or output neuron) corresponds to the trigger or activation thereof by emission of an output spike which occurs when its integration (or accumulation) exceeds a threshold.

An input matrix or map 11 can correspond to an output map of a preceding layer, or to an input matrix of the network which receives the stimuli or a part of the stimuli to be processed. A network can be made up of one or more input matrices. They can be, for example, RGB, HSV, YUV components or any other conventional component of an image, with a matrix for each component. An input matrix denoted I comprises coefficients $I_{i,j}$, and has a size denoted $(I_h, I_w)$.

An output map O is connected to an input matrix I by a convolution operation, via a convolution kernel 12 denoted K (the convolution kernel is also called filter, or convolution matrix), of size (n, m) and comprising coefficients $K_{k,l}$. Each neuron of the output map 14 is connected to a part of the input matrix 11, this part being also called "input submatrix" or "neuron receptor field" and being of the same size as the convolution matrix K. The convolution matrix K comprising the synaptic weights is common for all the neurons of the output map O (the weights of the matrix K are then called "shared weights"). Each output coefficient of the output matrix $O_{i,j}$ then satisfies the following formula:

$$O_{i,j} = g\left( \sum_{k=0}^{min(n-1, I_h - i \cdot s_i)} \sum_{l=0}^{min(m-1, I_w - j \cdot s_j)} I_{i \cdot s_i + k, j \cdot s_j + l} \cdot K_{k,l} \right)$$

In the above formula g( ) designates the neuron activation function, whereas $s_i$ and $s_j$ designate the respectively vertical and horizontal stride parameters. Such a stride parameter corresponds to the stride between each application of the convolution kernel to the input matrix. For example, if the stride is greater than or equal to the size of the kernel, then there is no overlap between each application of the kernel.

An output map O is connected to an input matrix I by a "pooling" operation which produces a downsampling of the input matrix, which supplies a downsample matrix. The downsampling can be of two types:

a downsampling type called "MAX pooling" (maximum grouping) according to the following equation:

$$O_{i,j} = g(\max_{k=0}^{min(n-1, I_h - i \cdot s_i)} \max_{l=0}^{min(m-1, I_w - j \cdot s_j)} I_{i \cdot s_i + k, j \cdot s_j + l})$$

a sampling type called "AVERAGE pooling" (average grouping) according to the following equation:

$$O_{i,j} = g\left( \frac{1}{n.m} \sum_{k=0}^{min(n-1, I_h - i \cdot s_i)} \sum_{l=0}^{min(m-1, I_w - j \cdot s_j)} I_{i \cdot s_i + k, j \cdot s_j + l} \right)$$

The synaptic weights associated with the connections in the case of a "pooling" layer are generally unitary and do not therefore appear in the above formulae.

A fully connected layer comprises a set of neurons, each neuron being connected to all the inputs of the layer. Each neuron $O_j$ has its own synaptic weights $W_{i,j}$ with the corresponding inputs $I_i$ and performs the weighted sum of the input coefficients with the weights which is then passed to the activation function of the neuron to obtain the output of the neuron.

$$O_j = g\left( \sum_i I_i \cdot W_{i,j} \right)$$

The activation function of the neurons g( ) is generally a sigmoid function, such as, for example, the function tan h( ). For the "pooling" layers, the activation function can, for example, be the identity function.

The synaptic weights are determined by learning. The learning of a neural network consists in finding the optimum values of the synaptic weights from an optimization method and a learning base. There are a multitude of learning methods such as the gradient backpropagation method, the basic principle consisting, from a stimulus at the input of the network, in computing the output of the network, comparing it to the expected output (in the case of a so-called supervised learning) and backpropagating an error signal in the network, which modifies the synaptic weights by a gradient descent method.

Figure 5:
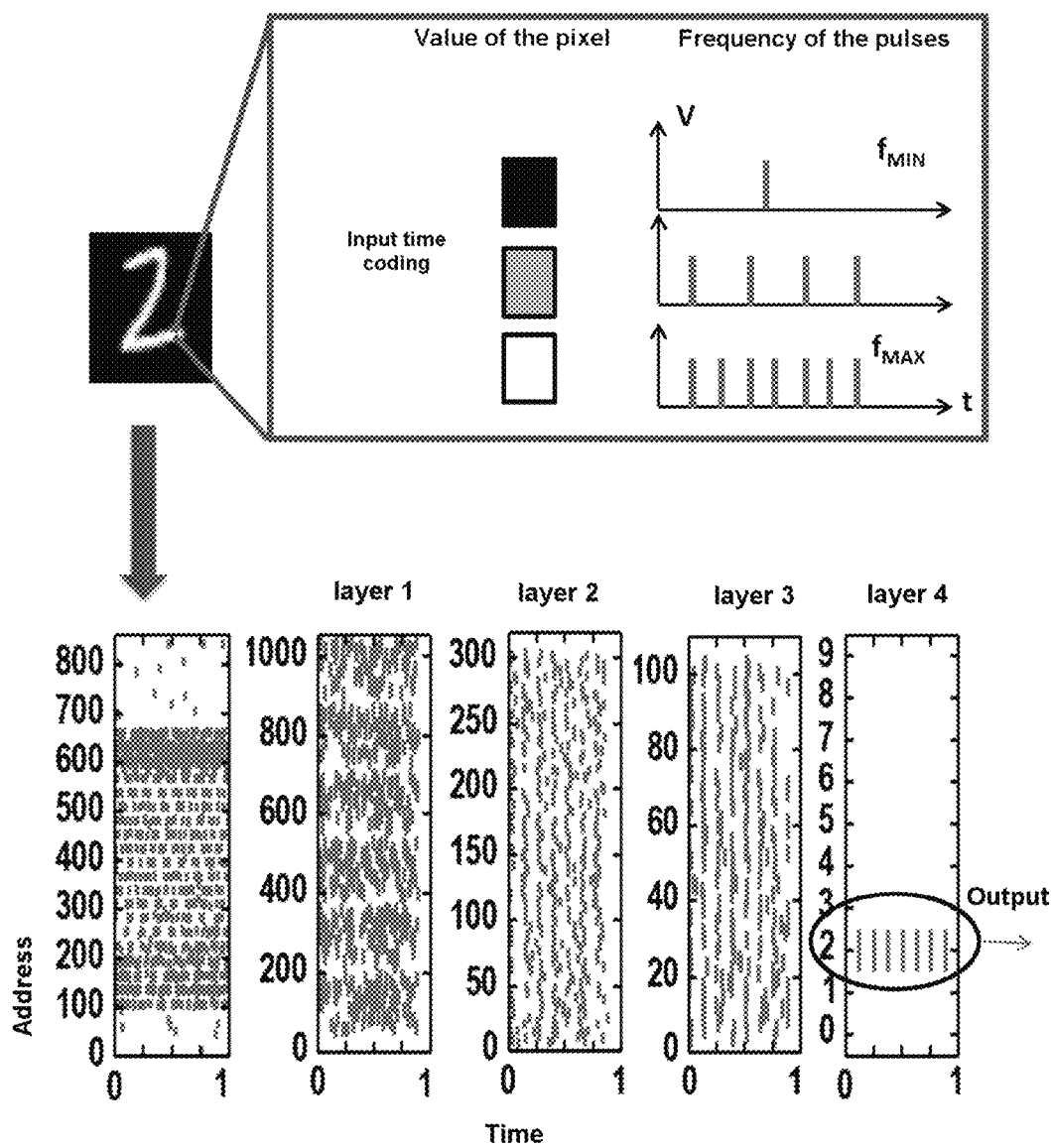
FIG. 5 is a diagram illustrating the spike coding and the propagation in the neural network of the spikes.

The neural networks can be transposed into spike coding as illustrated in FIG. 5. In this case, the signals propagated at the input and at the output of the layers of the network are no longer numeric values, but electrical spikes (that can be likened to Dirac spikes). The information which was coded in the value of the signals (normalized between −1 and 1) is then time-coded with the order of arrival of the spikes (rank order coding) or with the frequency of the spikes.

In the case of rank order coding, the instant of arrival of the spike is inversely proportional to the absolute value of the signal to be coded. The sign of the spike then determines the sign of the value of the signal to be coded.

In a frequency coding case, the frequency of the spikes, lying between $f_{min}$ and $f_{max}$, is proportional to the absolute value of the signal to be coded. The sign of the spike determines the sign of the value of the signal to be coded. For example, considering an input matrix of the network corresponding to the luminance component of an image, normalized between 0 and 1, a white pixel (or coefficient of the matrix), coded by a value 1, will emit spikes at a frequency $f_{max}$, a black pixel, coded by a value 0, will emit spikes at a frequency $f_{min}$, while a grey pixel, coded by a value x, will emit spikes at a frequency $f = f_{min} + x(f_{max} - f_{min})$. The coding can also be pseudo-frequency coding, for example a Poisson coding: in this case, $f_{max}$ and $f_{min}$ represent only average frequencies. The initial phase of the spikes can be random.

The spikes can also originate directly from a sensor, such as a retina or an artificial cochlea, mimicking the operation of their biological equivalent.

In the case of a spike neuron, the weighted sum of the synaptic weights with the input signals is replaced by the integration of the spikes originating from the same inputs weighted by the synaptic weights. All the spikes are identical, except for their sign, so that their integral can be considered to be unitary or normalized.

Moreover, in the spike approach, the activation function of the neuron is replaced by a thresholding which is unitary in the case of synaptic weights normalized between −1 and 1. When the absolute value of the integration of the neuron exceeds the threshold defined by the thresholding, the neuron emits an output spike, which is propagated to all the neurons of the following layers connected to this neuron. The sign of this spike corresponds to the sign of the integration of the neuron. When the neuron emits a spike, its integration is reset to 0 and the neuron enters into a so-called "refractory" period.

When a neuron is in "refractory" period, it cannot emit any new output spike, until the end of the refractory period, which can be equal to the minimum period of the spikes being propagated in the network.

The artificial synapses of a neural network can be produced from memristive devices. A memristive device is an electronic component with two terminals which behaves like a resistor or a conductor, the value of which can be changed with the application of a current or a voltage to its terminals. A device of this type can be characterized by the following equations:

$$i = G.v$$

$$\frac{dG}{dt} = f(v, G)$$

In the above equations, G denotes the conductance of the device which links its input current i to the voltage at its terminals v.

A memristive device can be binary and/or stochastic. A family of memristive devices particularly suited to the production of artificial synapses in a neural network is such that the characteristic f(v,G) is nonlinear, such as, for example, the devices of MIM (Metal-Insulator-Metal) type which constitute the basic cell of several nonvolatile memory technologies such as RRAM "Resistive Random Access Memory", CBRAM "Conductive-Bridging RAM" and OxRAM "Oxide-based Resistive Random Access Memory". Thus, a synapse can be composed of one or more memristive devices.

Many other technologies can also be considered as memristive, like the phase change memory (PCRAM or PCM), the floating gate transistors, the memristors, the organic memristors, the NOMFET transistor (Nano-particle Organic Memory Field Effect Transistor).

Furthermore, a memristive device can be emulated by a conventional digital memory cell, of RAM "Random Access Memory", ROM "Read-Only Memory", PROM "Programmable ROM" or register type for example. A synapse can thus be implemented by such an N-bit memory, thus emulating a memristive device of $2^N$ analog levels.

An artificial neural network can be produced by using such memristive devices as artificial synapses and by incorporating them in a structure of "crossbar" type.

Figure 6:
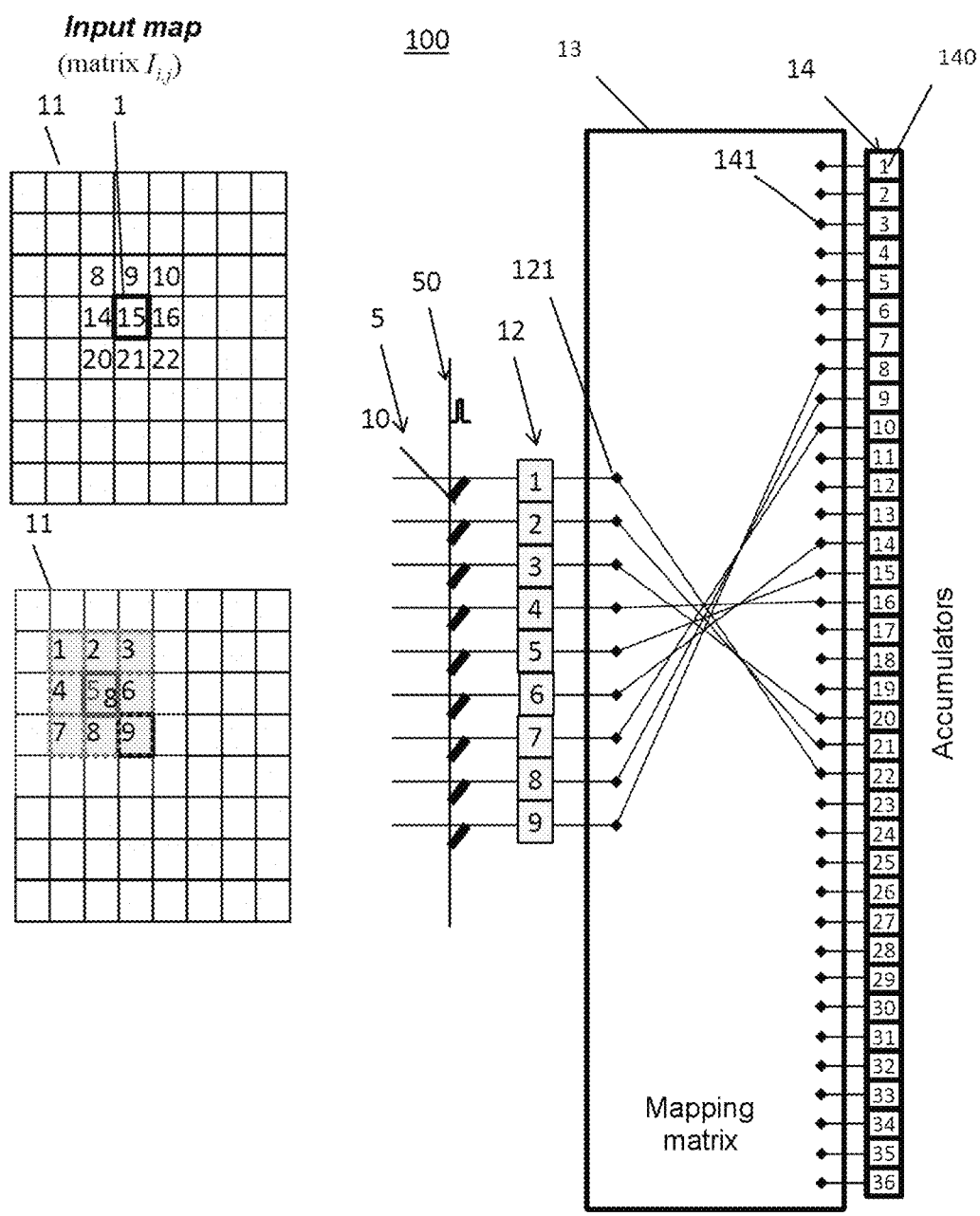
FIG. 6 represents a hardware device implementing a spike convolutional neural network, according to certain embodiments.

FIG. 6 represents a hardware device 100 implementing an output map of a convolutional layer of a spike convolutional neural network, according to certain embodiments.

According to one aspect of the invention, the device 100 is made up of synapses 10, each synapse being implemented from one or more memristive devices, to perform the convolution operations of a convolutional neural network 11 without it being necessary to use computation units for such operations and convolution kernel copy operations. Hereinafter in the description, reference will be made primarily to a single "memristive device" as constituent element of a synapse by way of illustration. However, the invention applies also to a synapse made up of several memristive devices in parallel, the equivalent conductance of which corresponds to the sum of the conductances of the individual memristive devices.

The matrix ("crossbar") in which the memristive devices 10 are incorporated is denoted by the reference 5. In FIG. 6, the coefficients of the kernel 12 are numbered from 1 to 9 and spread vertically.

Although not limited to such applications, the device 100 can be used to produce a physical implementation of convolutional neural networks for image classification and recognition. The rest of the description will be made essentially with reference to input maps comprising neurons of pixel type, by way of illustration.

The convolution operations implemented by the device 100 make it possible to determine each coefficient $O_{i,j}$ of the output matrix 14 for a convolution layer given from the input matrix 11 (also denoted I) of the convolution layer and of the convolution kernel 12 (also denoted K). The convolution operation from which each output coefficient $O_{i,j}$ is defined is given by the equation 1 below:

$$O_{i,j} = g\left( \sum_{k=0}^{min(n-1, l_h - i.s_i)} \sum_{l=0}^{min(m-1, l_w - j.s_j)} I_{i.s_i + k, j.s_j + l} K_{k,l} \right) \quad (1)$$

In this equation, the coefficients represent the coefficients $I_{i,j}$ of the input matrix I of the convolution layer concerned, and the coefficients $K_{k,l}$ represent the coefficients of the convolution kernel 12 (weights of the interneural connections).

More particularly, the neural network device 100 uses a plurality of memristive devices 10 to store the convolution kernel or kernels 12 associated with an output matrix of the convolution layer. Each memristive device 10 has an electrically-switchable resistance value and can be of any type (like a transistor for example). In one embodiment, the device 100 can use one or more memristive devices, constituting a synapse 10 for each coefficient of the convolution kernel $K_{k,l}$.

The spikes passing between the layers of the neural network can be coded in the AER (Address-Event Representation) format. In this format, the spike is digital and made up of a bitstream coding the destination address (X, Y) of the spike according to two right-angled axes X and Y, the reference point (X, Y) corresponding to the reference point of the input matrix, as well as the sign of the spike. When the spike arrives on the input matrix, the coded address (X, Y) represents the location of the input neuron to be activated. Thus, when a spike arrives on the input matrix, its address (X, Y) gives the location to be activated $I_{i,j}$, with:

$$X \rightarrow j \text{ and } Y \rightarrow i.$$

According to another feature, the device 100 can additionally apply an information time-coding operation to produce each convolution between the input matrix 1 of a given convolution layer and the convolution kernel 12, the operation of weighting of the input coefficients of the input matrix 1 of a given convolution layer with the coefficients $K_{k,l}$ of the convolution kernel then being time-multiplexed. According to one aspect of the invention, the weighting operation is performed directly in the memristive devices 10 storing the coefficients corresponding to the weights of the convolution kernel, by Ohm's law:

$$I = G(\text{conductance}) * U,$$

in which G denotes the conductance of one or more memristive devices forming a synapse, and U denotes the voltage of a spike which is set, the value of the input coefficient $I_{i,j}$ being time-coded (for example by frequency coding or rank coding). The parameter I is the value to be accumulated in the corresponding output neuron.

An input neuron 1 belongs to the receptor field of one or more output neurons 140.

In FIG. 6, a neuron of the input matrix is activated (pixel in the example considered) and is surrounded by a black frame. In the representation of the state of activation of the matrix 11, the pixel 28 of the input matrix is activated.

Assuming that the convolution kernel has a size of 3×3 and that the stride is 1, the input pixel considered belongs to the receptor field of 9 output neurons (upper part of FIG. 6):
- the activated pixel is connected to the receptor field of the output neuron No. 8, with the coefficient No. 9 of the convolution kernel (lower part of FIG. 6);
- the activated pixel is connected to the receptor field of the output neuron No. 9, with the coefficient No. 8 of the convolution kernel;
- the activated pixel is connected to the receptor field of the output neuron No. 10, with the coefficient No. 7 of the convolution kernel;
- etc.

According to another aspect of the invention, the coefficients $I_{i,j}$ of the input matrix I can be implemented materially by a predefined frequency of the spikes while the coefficients $K_{k,l}$ are stored in the form of an electrical conductance of a memristive device 10. Thus, each memristive device 10 is configured to receive a pre-synaptic spike emitted by a neuron of the input matrix 1 to which it is connected upstream. As used here, the expression "pre-synaptic spike" denotes a spike emitted by a neuron toward a synapse to which it is connected downstream. A pre-synaptic spike thus emitted from an input neuron 11 is propagated to the synapse, materialized by the memristive device 10, to which the input neuron is connected. An input spike is propagated from the input neuron to the output neurons which have the input neuron in their receptor field, according to the example of FIG. 6. The spike arriving on each output neuron is weighted by the synaptic weight corresponding to the coefficient of the associated convolution kernel for this input. This weighting can be done electrically by modulation of the voltage of the spike with the equivalent conductance of the synapse, made up of one or more memristive devices, using Ohm's law. A spike modulated in this way arriving on an output neuron is then integrated in the neuron (analogically or digitally), which emits an output spike if this integration exceeds a threshold value.

According to a feature of the invention, the device 100 comprises a mapping matrix 13 configured to dynamically associate (operation called dynamic mapping) each output 121 of the convolution kernel corresponding to a coefficient of the convolution kernel, with a position 140 of the accumulation matrix 14, upon the activation of an input neuron. The dynamic mapping operation maps the coefficients of the kernel, with all the output neurons involving the input activated for the computation of the convolution, as described by the preceding equations. For example, as represented in FIG. 6, when the input neuron 1 is triggered, the horizontal line intersecting the vertical line linked to the element 9 in the matrix 12 representing the convolution kernel 12 is connected dynamically, at its end 121, to the position 8 of the accumulator 14.

Thus, for an input $I_{i,j}$ of the input matrix activated (activated for example with an AER spike originating from a preceding layer or from a retina or artificial cochlea-type sensor with the address (X, Y)), the coefficients $K_{k,l}$ of the convolution kernel are connected to the outputs $$O_{\frac{i-k}{s_i}, \frac{j-l}{s_j}}$$

as follows:

$$K_{k,l} \rightarrow O_{\frac{i-k}{s_i}, \frac{j-l}{s_j}}$$

For
k=i mod $s_i$; k<min(n, i+1); k=k+$s_i$
l=j mod $s_j$; l<min(m,j+1);l=l+$s_j$ The dynamic mapping operation (dynamic mapping) thus makes it possible to invert the convolution equation:

$$O_{i,j} = g\left( \sum_{k=0}^{min(n-1, l_h - i \cdot s_i)} \sum_{l=0}^{min(m-1, l_w - j \cdot s_j)} I_{i \cdot s_i + k, j \cdot s_j + l} K_{k,l} \right)$$

The convolution operation is done by accumulation of the coefficients of the convolution kernel connected dynamically to the respective accumulators 140 on each arrival of a spike on the outputs 121. The spike is propagated on the vertical line 50.

The dynamic mapping between the convolution kernel 12 and the outputs 140 is made possible by virtue of the spike coding of the inputs, applied to the memristive devices.

When the propagation of the spikes is triggered as a function of the predefined spike frequency, the spikes are propagated to the respective accumulators 140 to which they are connected by the mapping matrix through the memristive devices.

Figure 7:
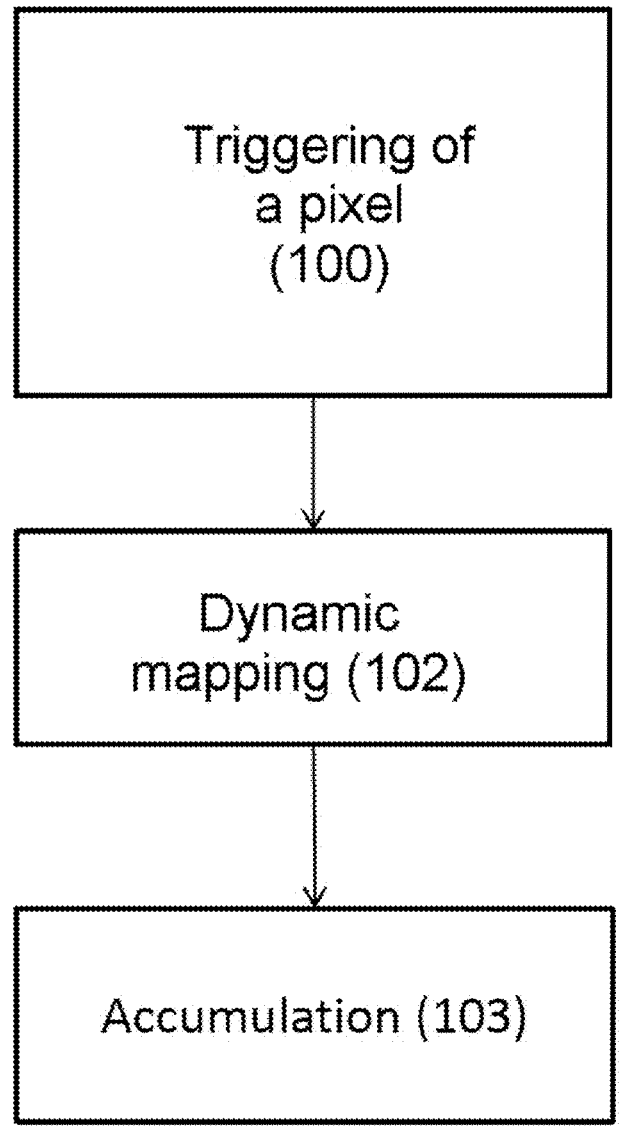
FIG. 7 is a flow diagram representing the convolution method, according to certain embodiments.

FIG. 7 is a flow diagram representing the convolution method, according to certain embodiments.

In the step 100, a neuron of the input matrix I, belonging to a given convolution layer, is triggered by an event. An input neuron belongs to the receptor field of one or more output neurons (i.e. the input neuron is connected to these output neurons). The input neuron can be of any type such as a pixel in the case of a spike-coded input image. The trigger event can for example be derived from the preceding convolution layer or from an event-driven sensor, such as a retina, a cochlea, or even a frequency coding of static data, such as images or a time-frequency spectrum.

In response to the triggering of the input neuron, in the step 102, a dynamic mapping is implemented to map the coefficients of the convolution kernel with the outputs for which the input pixel has a contribution.

In the step 101, in response to the triggering of the input neuron, the memristive devices 10 storing the coefficients of the convolution kernel are dynamically connected to the corresponding output neurons. The step 101 of dynamic mapping between the memristive devices 10 and the output neurons can be implemented according to different types of dynamic routing methods such as:

a parallel routing;
a semi-sequential routing on y;
a sequential routing; or
a semi-sequential routing on x.

The step 101 is reiterated for each new input neuron triggered if this input neuron is different from the neuron triggered previously.

The dynamic routing methods can be analog or digital.

Each type of routing method offers a different compromise in terms of number of cycles and number of switches. The parallel routing, for example, makes it possible to propagate the input spike to all the output neurons for which it has a contribution one time, simultaneously, but requires a higher number of switches for the dynamic routing.

An accumulation step 103 can then be implemented from the propagation of the spikes. In one embodiment, the accumulation step 103 is implemented on the convolution kernel side, in two substeps (read-add then write back). In a variant, it can be implemented on the side of the outputs 121 in a single add-write step.

In the embodiment in which the accumulation is implemented on the convolution kernel side in two sub-steps, for each output neuron 141 connected to a memristive device 10, the value of the accumulation is propagated initially from each output neuron to an intermediate accumulator (accumulator 22 in FIGS. 8 and 9) present in the output nodes 121 of the matrix 12 containing the coefficients of the convolution kernel stored by the memristive devices 10. Depending on the type of routing, the spikes can be propagated simultaneously or not. For example, in the case of a parallel routing, they can be propagated simultaneously. At one and the same time, the input spike is propagated to each synapse and is weighted by the value of the synapse. For each synapse, the spike, once weighted, is added in the intermediate accumulator present in the output nodes 121 with the value of the accumulation previously stored in the accumulator 140 of the corresponding output neuron 141 (read-add step). This read-add step can be performed in parallel, according to the type of routing chosen for the dynamic mapping. Secondly, when the accumulation has been performed for all the output neurons 141 identified in the receptor field of the input neuron 110 which was activated in the step 100, the values accumulated in the intermediate accumulators can be propagated to the corresponding output neurons 141 and stored in the corresponding accumulators 140, in the step 103 (write back step). The step 103 can be performed in parallel, according to the type of routing chosen for the dynamic mapping.

In the embodiment in which the accumulation is implemented on the side of the output neurons 141 in a single add-write step, the accumulation can be performed directly in the output neurons 141 and be carried out in parallel, according to the type of routing chosen for the dynamic mapping.

In another embodiment in which the dynamic mapping operation is not implemented in parallel, the read-add step can be performed for a first group of synapses, then the write-back step can be carried out for this same first group, before going on to the next group and changing the dynamic mapping. Such an embodiment dispenses with the need to perform the same mapping twice each time, a first time for the read-add and a second time for the read-write. Furthermore, it makes it possible to reduce the number of intermediate accumulators, since from one synapse group to another, the same accumulators can be reused.

The neural network can be produced by incorporating the memristive devices 10 in a structure of "crossbar" type, with or without selection device (transistor, diode or other device with non-linearity).

Figure 8:
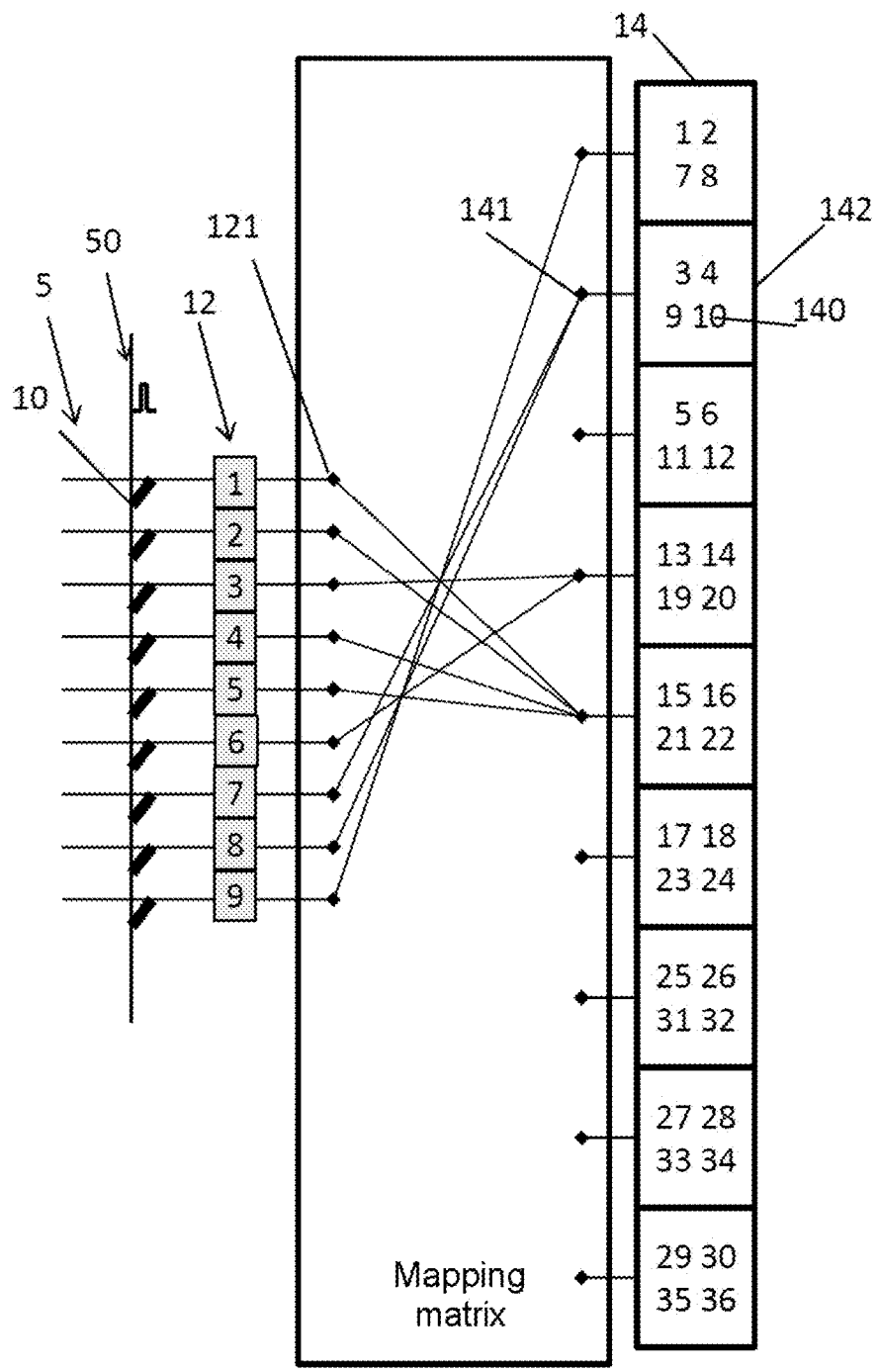
FIG. 8 is a schematic representation of another example of physical implementation of the convolution operations in a neural network with grouping together of the outputs (output downsampling)

FIG. 8 is a schematic representation of another example of physical implementation of the convolution operations in a neural network with a pooling of the outputs by downsampling.

The operation of pooling of the outputs by downsampling consists in assembling the neighboring outputs to form a new, smaller output matrix 14.

In the embodiment of FIG. 8, the output pooling is performed directly at the accumulation level, by pooling the accumulators 140 corresponding to the same output in groups 142, in the scaled matrix 14.

The number of accumulators and the size of the mapping matrix are thus reduced.

According to a feature of the invention, the maximum size of the matrix of the memristive devices 10 can advantageously be equal to the size of the convolution kernel 12, of size 35×35, 11×11 or 5×5 for example. The size can notably be limited by the leakage currents. In the embodiments using a mapping matrix 13, the mapping matrix 13 (analog) can be of small size and can be produced in CMOS. In a variant, it can be produced materially with memristive devices.

The neural network device 100 can also operate with a learning method, such as, for example, an in-situ, or online, STDP (Spike Timing Dependent Plasticity) rule-based learning method.

The mapping matrix performs the address decoding making it possible to map the synaptic weights with the output neurons for a given activated input.

Figure 9:
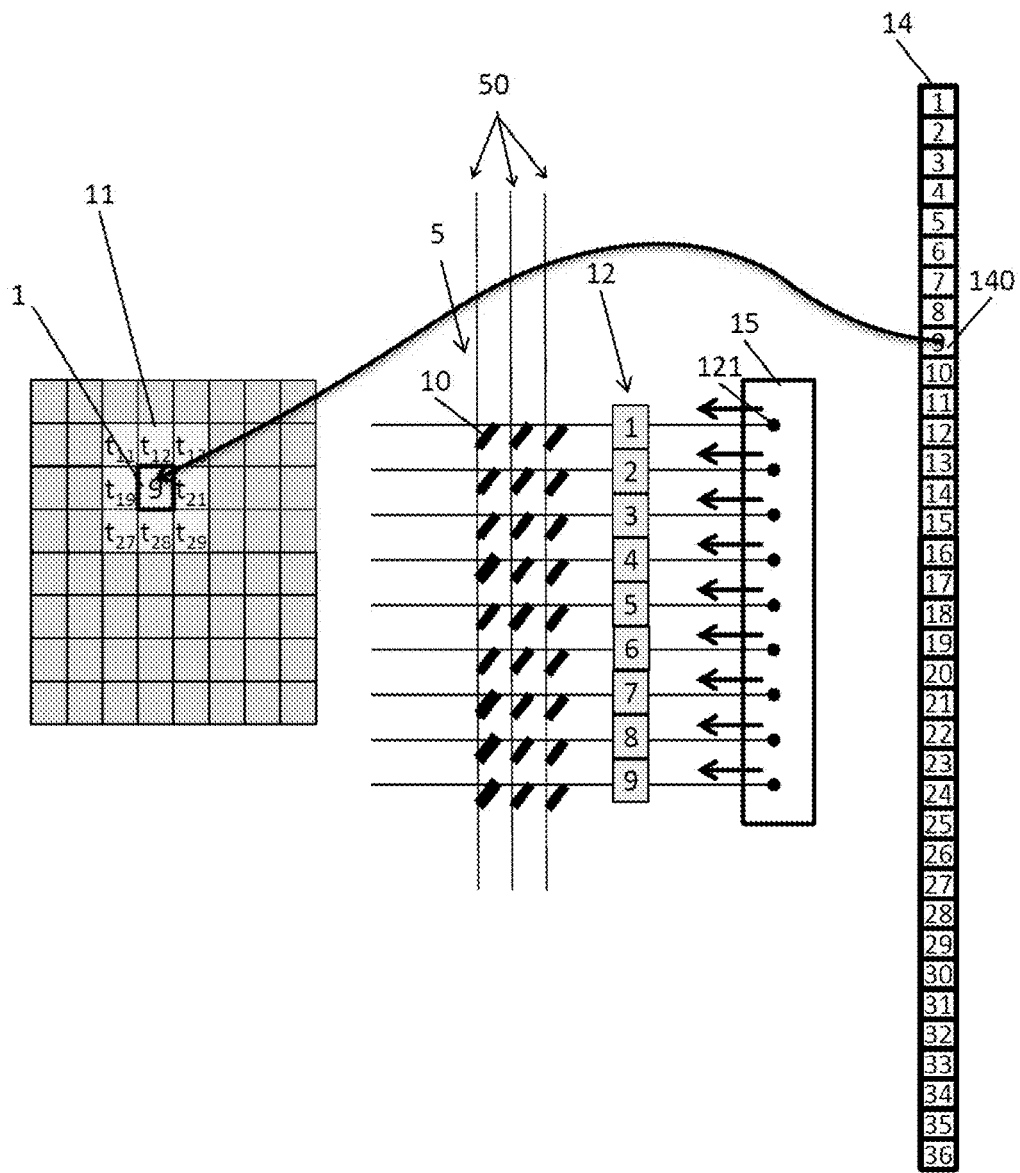
FIG. 9 is a schematic representation of another example of physical implementation of the convolution operations in a neural network with STDP learning.
Figure 10:
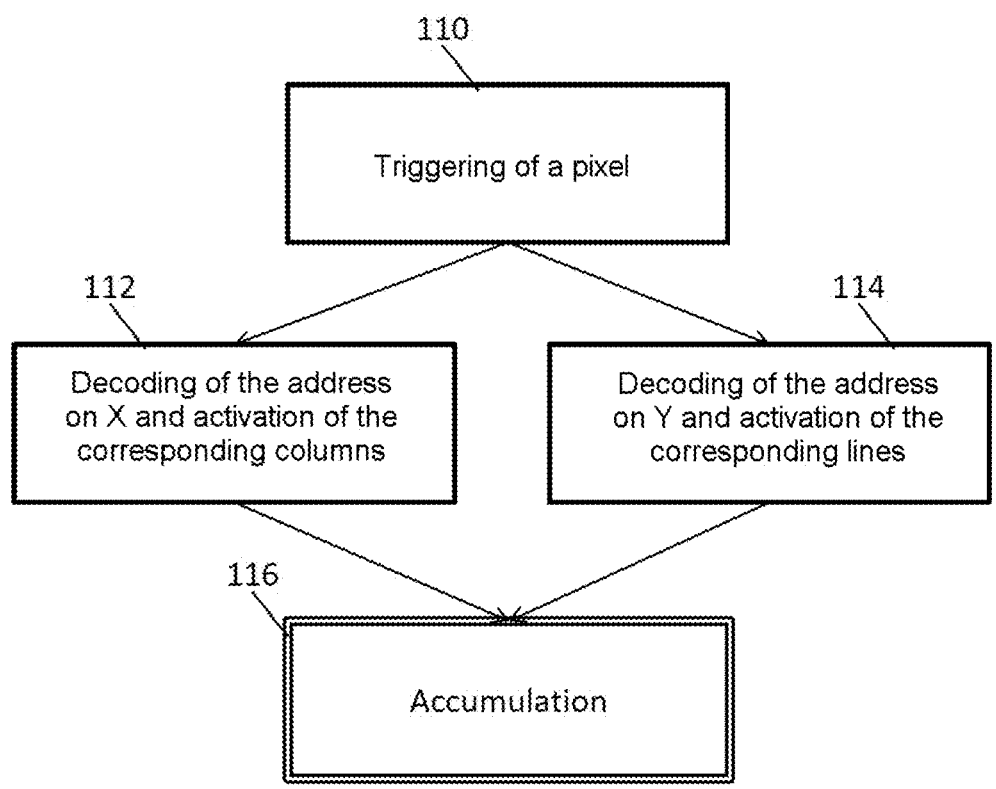
FIG. 10 is a flow diagram illustrating the step of dynamic mapping, according to a parallel embodiment (in one cycle)

In the example of FIG. 9, each synapse is made up of three devices (each line implementing a coefficient of the convolution kernel). In this case, a spike can be propagated simultaneously to all the columns to obtain, at the end of each line, a current spike weighted by the equivalent conductance of the synapse corresponding to the sum of the conductances of the constituent devices of the synapse. The spikes are propagated on the vertical lines 5 of the "crossbar" matrix 5.

In such an embodiment (synapse is made up of several memristive devices), the accumulation step 103 of FIG. 7 can be implemented sequentially, by activating one memristive device after another, with an adder (1+x) per line, or synapse, the value "1" being added to the value "x" accumulated by the corresponding output neuron 140. That is equivalent to having several columns of devices, as in FIG. 9.

In a variant, the accumulation step can be implemented in a single step, by using several thresholds (as many as there are devices per synapse) and one adder per line. The thresholds can be increasing multiples of the basic threshold, so as to produce a digitizing of the equivalent synaptic weight stored in the set of the devices forming a line. This embodiment is particularly suited to the case of binary devices, able to store only an "ON" (active) or "OFF" (inactive) state. The basic threshold is set to be triggered in the case where at least one of the devices is in the "ON" state. For example, if the equivalent synapse is made up of four devices, of which two are in the "ON" state, the first two thresholds will be triggered on all four, thus coding the value of the synapse as 2/4. Such an embodiment can be implemented by using digital accumulators 140 or, in a variant, analog accumulators, with the use of an analog-digital converter (ADC) for each line.

Figure 11:
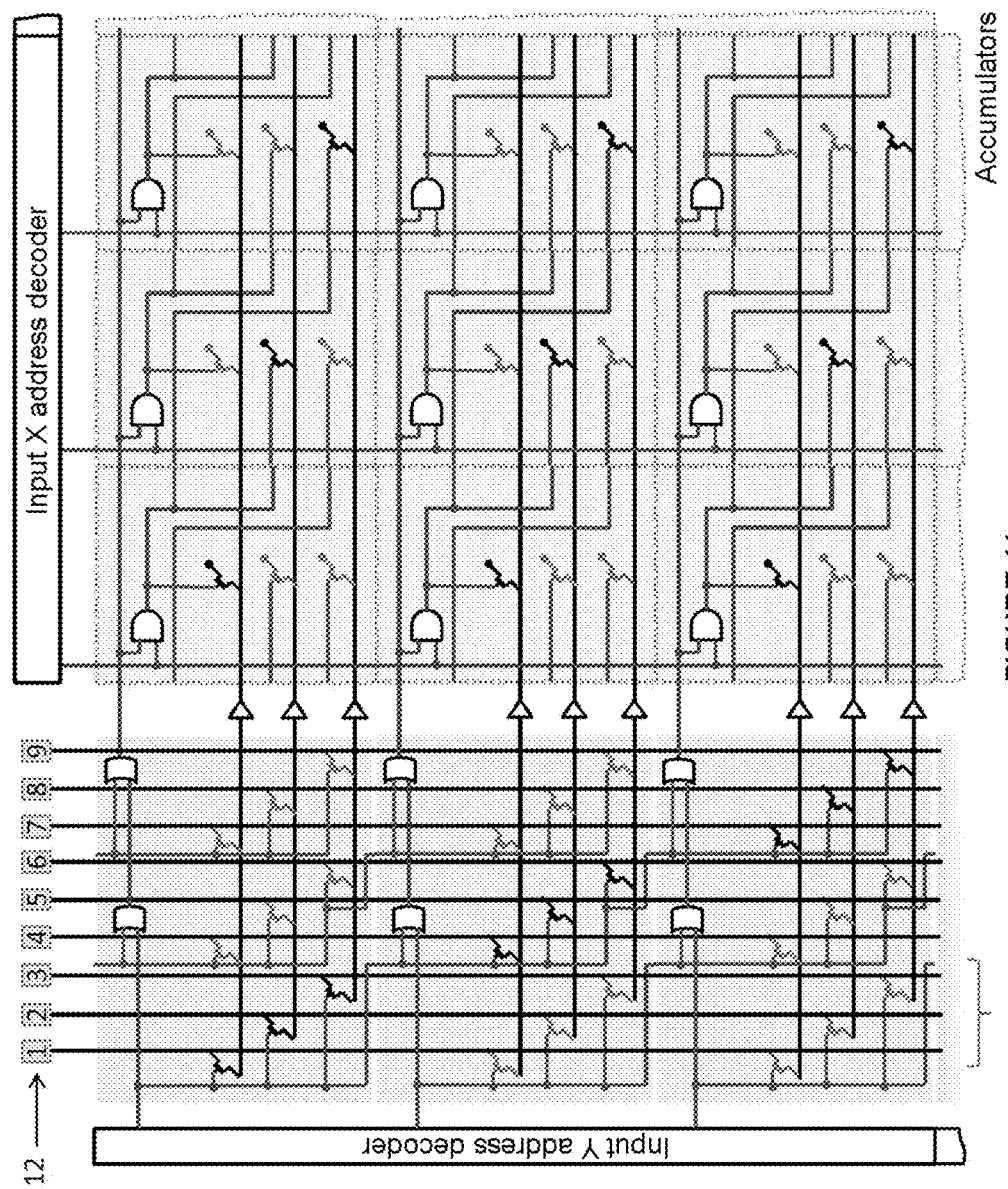
FIG. 11 represents an example of physical implementation of the neural network corresponding to a parallel embodiment (just 1 cycle) conforming to the embodiment of FIG. 10.

FIG. 11 is a schematic representation of another example of physical implementation of the convolution operations in a neural network with STDP (Spike-Timing-Dependent Plasticity) learning.

The STDP learning can be done in a step with interaction of pre- and post-synaptic spikes.

In the context of a learning rule of STDP type implemented by the neural network, pre-synaptic and post-synaptic spikes can for example be sent by the input and output neurons toward a synapse (made up of one or more memristive devices) to act on the variation of its conductance, for example as described in FR2977351 B1.

In the embodiment of FIG. 11, a write circuit 15 is used. Following the activation of an output neuron, the coefficients of the associated convolution kernel are mapped with the inputs forming the receptor field of the output neuron (dynamic mapping). The coefficients of the kernel are then modified as follows:

If the time of last activation of the input $t_{pre}$ (pre-synaptic time) immediately precedes the time of activation of the neuron $t_{post}$ (post-synaptic time) and lies in the potentiation time window of the neuron (LTP window), then the weight of the synapse (coefficient of the kernel) is increased (LTP);

If the time of last activation of the input does not lie in the LTP window, then the weight of the synapse is reduced (LTD).

In FIG. 11, $t_{xx}$ represents the time of the last event on a node, that is to say the pre-synaptic time (storage in memory). The term LTP (Long Term Potentiation) denotes the phases or states corresponding to an increase in the conductance of a synapse.

The STDP (Spike Timing Dependent Plasticity) learning rule consists in making the weight of a synapse evolve as a function of the time distance between the pre- and post-synaptic spikes. The LTP state corresponds to the state of potentiation of the synapse and the LTP phase has a given duration corresponding to the duration during which the conductance of the synapse increases. In the case of a conventional STDP learning rule, the variation of the conductance of the synapse can depend on the relative instants of arrival of the two spikes.

In a variant, the learning can also be stochastic.

The dynamic mapping operation makes it possible to effectively implement this learning rule in the case of a spike convolutional network.

FIGS. 12 to 17 represent embodiments of the step of dynamic mapping of the memristive devices 10 and of the output neurons located in the receptor field of an activated neuron (step 102 of FIG. 7).

Figure 12:
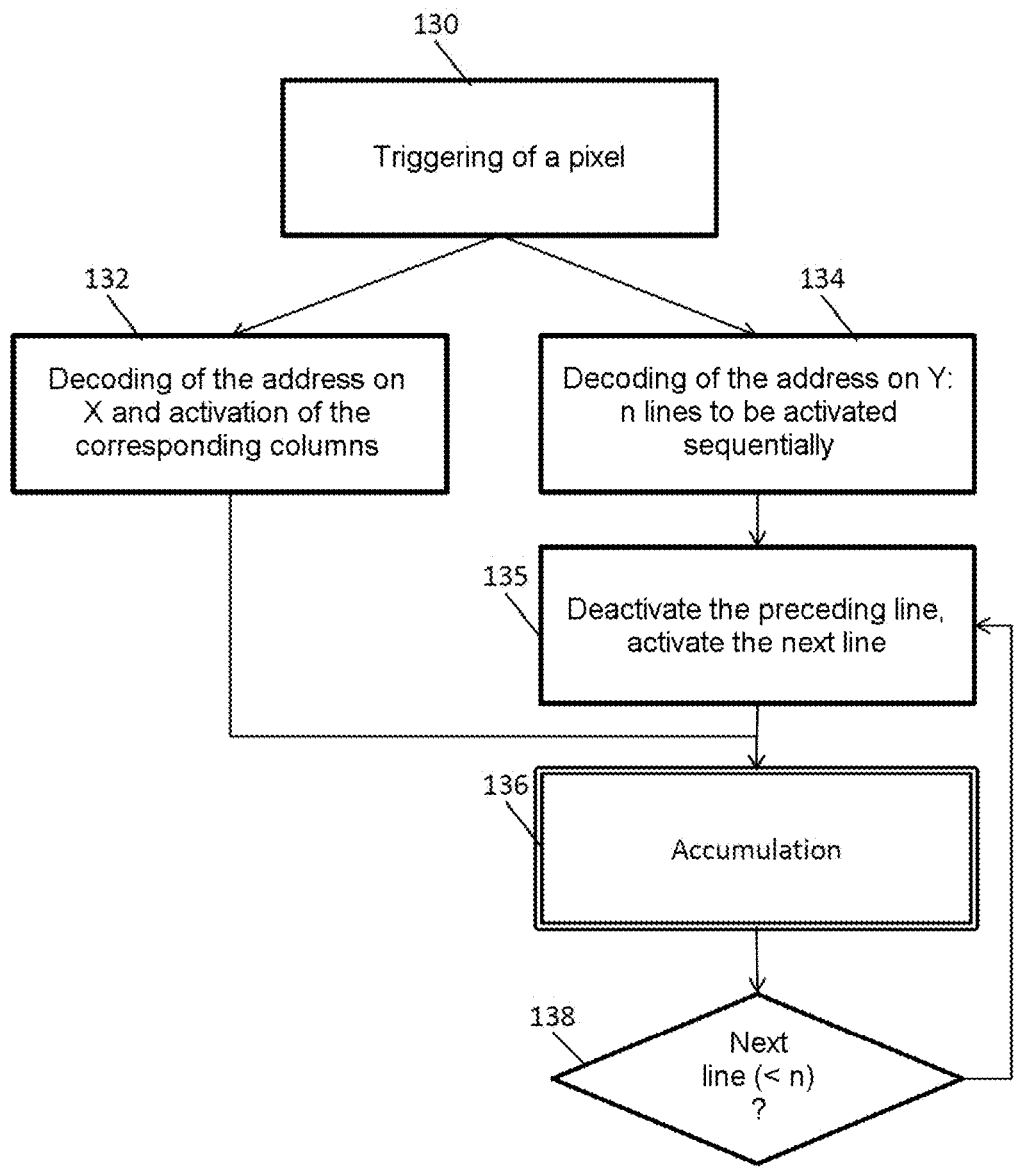
FIG. 12 is a flow diagram illustrating the step of dynamic mapping, according to a semi-sequential embodiment (in n cycles)

FIG. 12 is a flow diagram illustrating the dynamic mapping step, according to a parallel embodiment (in one cycle).

In the step 110, an input neuron is triggered (a pixel for example).

The steps 112 and 114 correspond to the dynamic mapping between the outputs 121 of the matrix 12 and the nodes 141 corresponding to the output neurons which are in the receptor field of the triggered neuron.

In the step 112, a decoding of the address on X of the input neuron is performed. The corresponding lines of the matrix 12 are then activated (each line corresponds to a different synapse or coefficient of the kernel).

In the step 114, a decoding of the address on Y of the input neuron is performed. The corresponding lines of the matrix 12 are then activated.

In the step 116, an accumulation of the values is performed in the output matrix 14 by propagation of the spikes as described previously.

Figure 13:
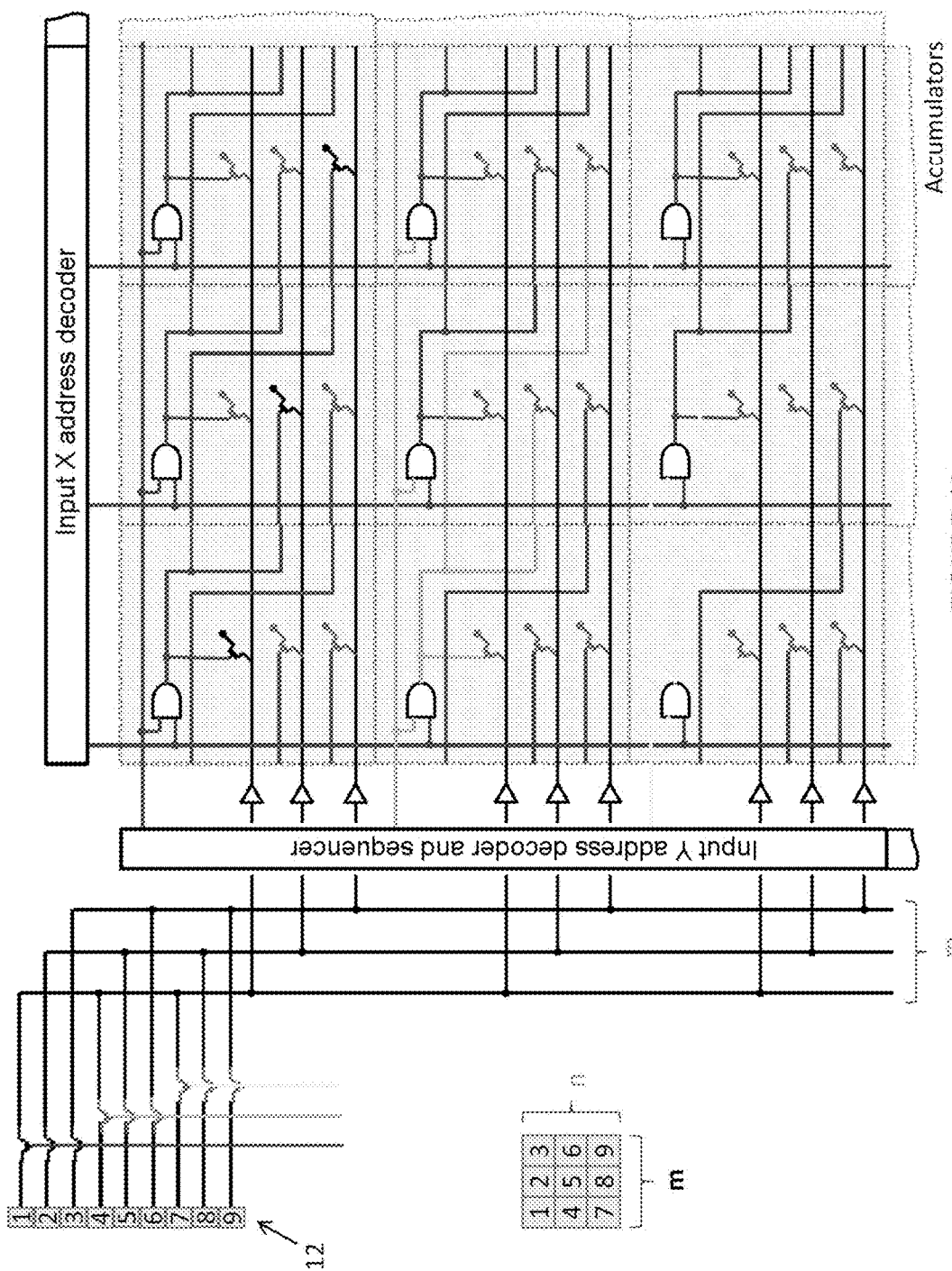
FIG. 13 represents an example of physical implementation of the neural network according to a semi-sequential mode on Y.

FIG. 13 represents an example of physical implementation of the neural network corresponding to a parallel embodiment (one single cycle) according to the embodiment of FIG. 12.

The accumulators 140 (right-hand part) are connected to the coefficients of the corresponding kernel after decoding on X and on Y.

The number of switches $N_{TG}$ used in the physical implementation of the neural network is then given by the following equation:

$$N_{TG} = m \cdot n \cdot O_h + M \cdot O_w \cdot O_h$$

This embodiment makes it possible to perform a convolution computation in a single cycle, but also necessitates a larger number of switches. This embodiment is particularly suited when the processing speed of the system is important.

FIG. 12 is a flow diagram illustrating the dynamic mapping step, according to a semi-sequential embodiment (in n cycles).

In the step 130, an input neuron is triggered (a pixel for example).

The dynamic mapping between the outputs 121 of the matrix 12 and the nodes 141 corresponding to the output neurons which are in the receptor field of the triggered neuron comprises the steps 132 to 135.

More specifically, in the step 132, a decoding of the address on X of the input neuron is performed. The corresponding columns of the matrix 12 are then activated.

In the step 134, a decoding of the address on Y of the input neuron is performed. The number of lines to be activated sequentially is defined by the parameter n, which corresponds to the number of lines in the convolution matrix K (12).

In the step 135, a line is activated (current line). If a line has been previously activated, this preceding line is deactivated first.

In the step 136, an accumulation of the values is performed in the output matrix 14 by spike propagation on the current activated line.

The next line is then activated in the step 138 if the number of lines already activated is less than n (i.e. the number of iterations of the steps 135/136 is less than n).

FIG. 13 represents an example of physical implementation of the neural network corresponding to a semi-sequential embodiment on Y, according to the embodiment of FIG. 12.

The accumulators 140 (right-hand part) are connected to the coefficients of the corresponding kernel after decoding on X and on Y.

The matrix 12 (left-hand part) is physically implemented by a set of memristive devices 10. The accumulation in the accumulators 140 is performed for each line activated sequentially by a sequencer.

The number of switches $N_{TG}$ used in the physical implementation of the neural network is then given by the following equation:

$$N_{TG} = m \cdot n + m \cdot O_w \cdot O_h$$

This embodiment offers a trade-off between the entirely parallel mode and the entirely sequential mode.

Figure 14:
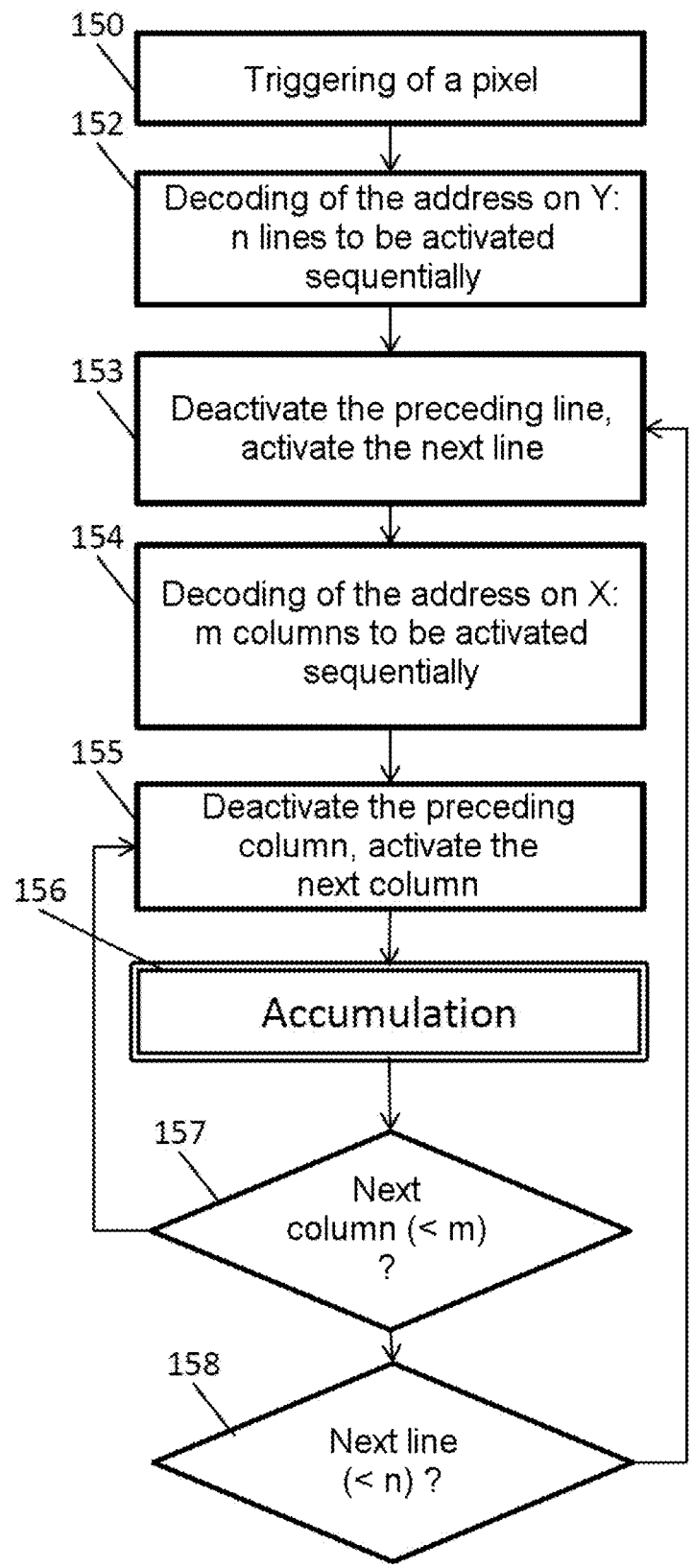
FIG. 14 is a flow diagram illustrating the step of dynamic mapping, according to a fully sequential embodiment.

FIG. 14 is a flow diagram illustrating the dynamic mapping step, according to a fully sequential embodiment (in m.n cycles).

In the step 150, an input neuron is triggered (a pixel for example).

The dynamic mapping between the outputs 121 of the matrix 12 and the nodes 141 corresponding to the output neurons which are in the receptor field of the triggered neuron comprises the steps 152 to 156.

More specifically, in the step 152, a decoding of the address on Y of the input neuron is performed. The number of lines to be activated sequentially is defined by the parameter n.

In the step 153, a line is activated (current line). If a line has been previously activated, this preceding line is deactivated first.

In the step 154, a decoding of the address on X of the input neuron is performed. The number of columns to be activated sequentially is defined by the parameter m, which corresponds to the number of columns in the convolution matrix K (12).

In the step 155, a column is activated (current column). If a column has been previously activated, this preceding column is deactivated first.

In the step 156, an accumulation of the values is performed in the output matrix 14 by propagation of spikes on the current lines and columns activated.

The next column is then activated in the step 157 if the number of lines already activated is less than m (i.e. number of iterations of the steps 153/156 is less than n).

The next line is then activated in the step 158 if the number of lines already activated is less than n (i.e. the number of iterations of the steps 153/156 is less than n).

It should be noted that the order of the symmetrical steps relating to the processing of the lines and the columns (152-153 and 154-155; 157 and 158) can be reversed.

Figure 15:
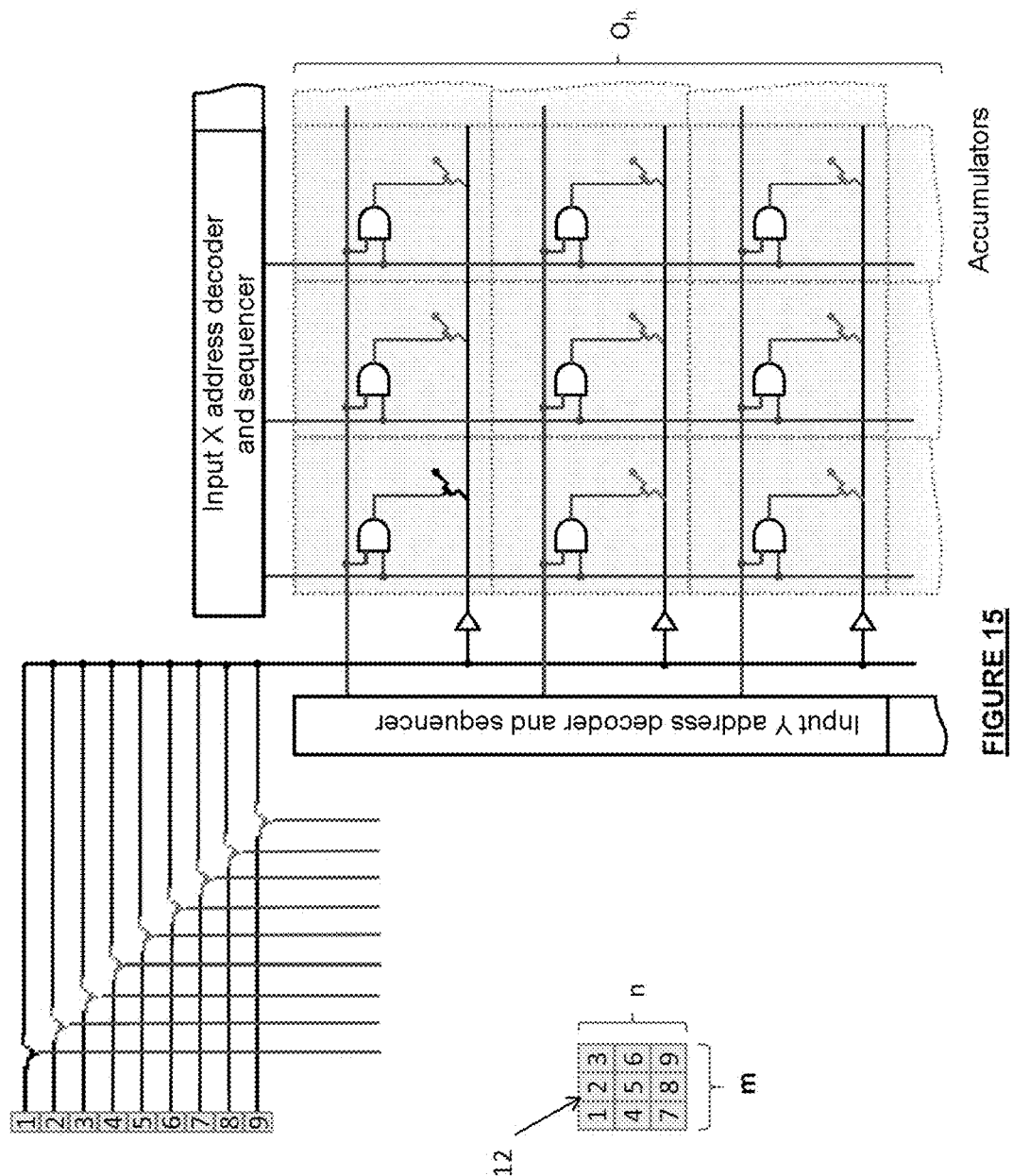
FIG. 15 represents an example of physical implementation of the neural network corresponding to a fully sequential embodiment.

FIG. 15 represents an example of physical implementation of the neural network corresponding to a full sequential embodiment, according to the embodiment of FIG. 14.

Each accumulator 140 (right-hand part) is connected sequentially to the corresponding coefficient of the kernel after decoding on X and on Y.

The matrix 12 (left-hand part) is physically implemented by a set of memristive devices 10. The accumulation in the accumulators 140 is performed for each line and column activated sequentially by a sequencer.

The number of switches $N_{TG}$ used in the physical implementation of the neural network is then given by the following equation:

$$N_{TG} = m \cdot n + O_w \cdot O_h$$

This embodiment minimizes the number of switches and therefore the complexity of the mapping matrix, but allows only one operation to be performed per cycle and consequently is of a priori limited interest compared to a conventional digital implementation of such a network in which the memory accesses are sequential.

Figure 16:
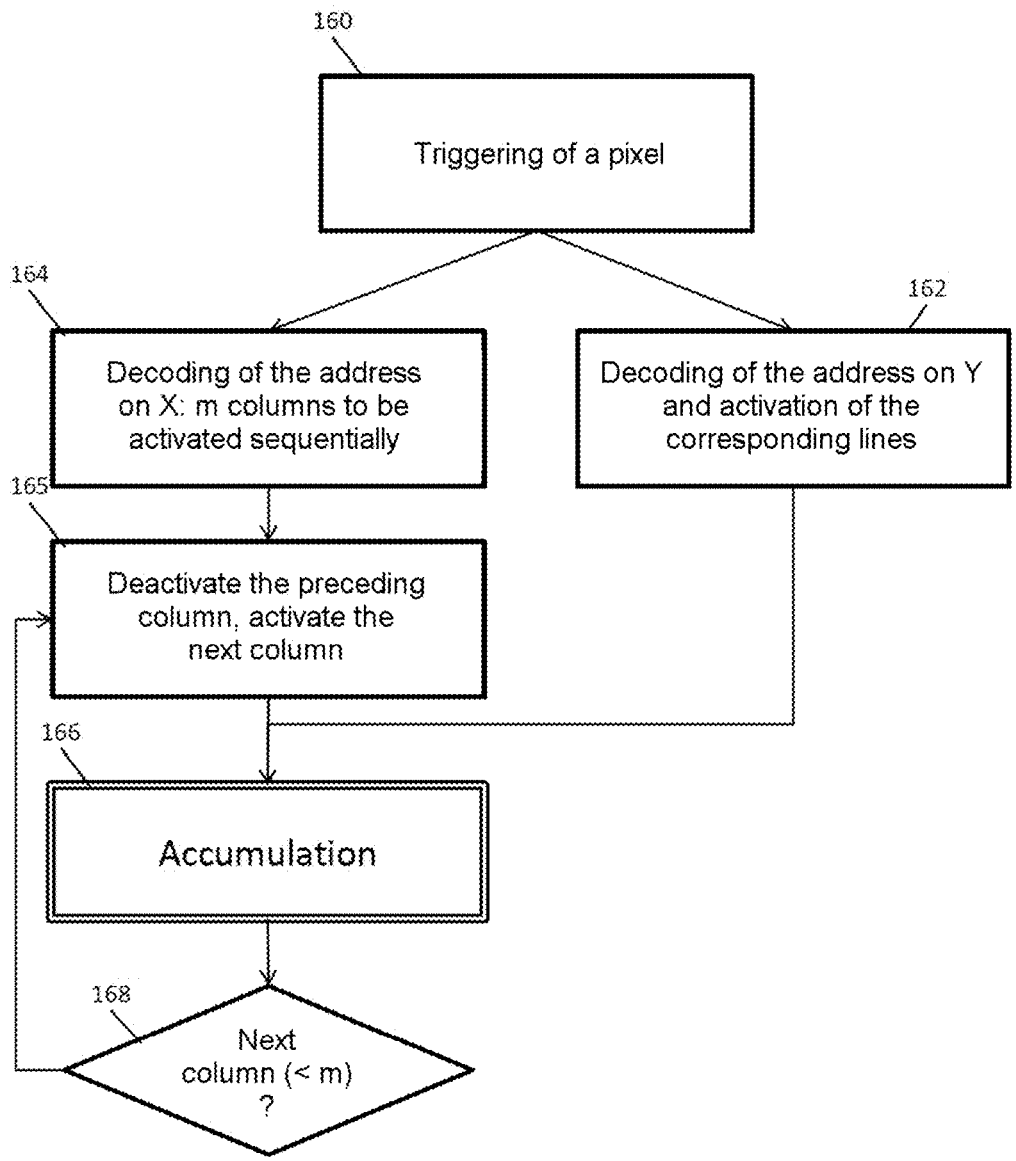
FIG. 16 is a flow diagram illustrating the step of dynamic mapping, according to a semi-sequential embodiment.

FIG. 16 is a flow diagram illustrating the dynamic mapping step, according to a semi-sequential embodiment (in m cycles).

In the step 160, an input neuron is triggered (a pixel for example).

The dynamic mapping between the outputs 121 of the matrix 12 and the nodes 141 corresponding to the output neurons which are in the receptor field of the triggered neuron comprises the steps 162 to 165.

More specifically, in the step 162, a decoding of the address on Y of the input neuron is performed. The corresponding lines of the matrix 12 are then activated.

In the step 164, a decoding of the address on X of the input neuron is performed. The number of columns to be activated sequentially is defined by the parameter m.

In the step 165, a column is activated (current line). If a column has been previously activated, this preceding column is deactivated first.

In the step 166, an accumulation of the values is performed in the output matrix 14 by propagation of spikes on the current activated column.

The next column is then activated if the number of lines already activated is less than m (i.e. the number of iterations of the steps 165/166 is less than m).

Figure 17:
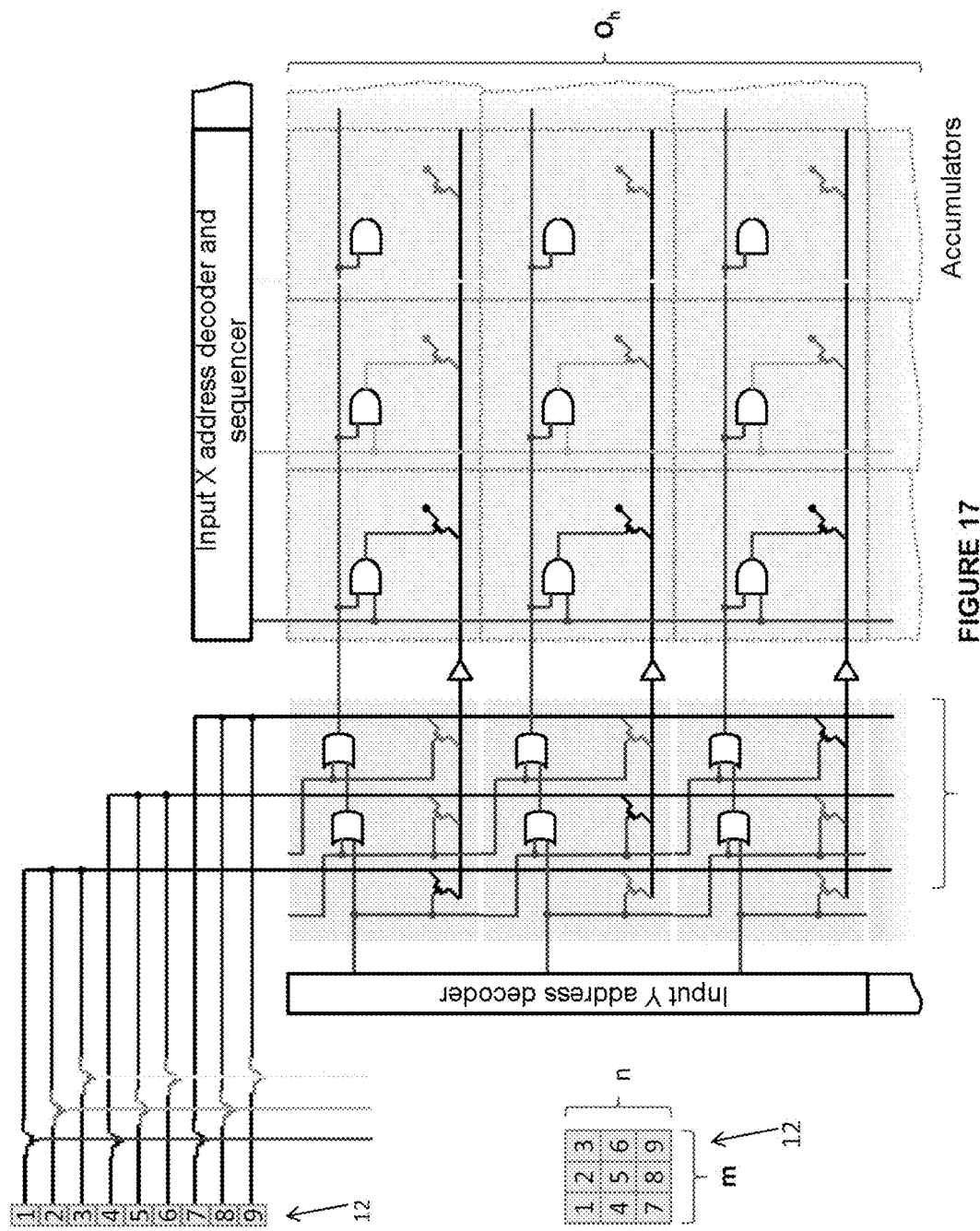
FIG. 17 represents an example of physical implementation of the neural network according to a semi-sequential mode on X.

FIG. 17 represents an example of physical implementation of the neural network corresponding to a semi-sequential embodiment on Y, according to the embodiment of FIG. 16.

The accumulators 140 (right-hand part) are connected to the coefficients of the corresponding kernel after decoding on X and on Y. The matrix 12 (left-hand part) is physically implemented by a set of memristive devices 10. The accumulation in the accumulators 140 is performed for each column activated sequentially by a sequencer.

The number of switches $N_{TG}$ used in the physical implementation of the neural network is then given by the following equation:

$$N_{TG} = m \cdot n + n \cdot O_h + O_w \cdot O_h$$

As represented in FIGS. 13, 15, 17, the connections produced by the dynamic mapping operation between the synapses and the accumulators of the output neurons convey the spikes weighted by the value of the synapses. Depending on the coding of these weighted spikes, the connections can be produced in different ways:

by analog connections (one single wire), conveying analog spikes whose amplitude or duration codes the weighting;

by digital connections (one single wire, 1 bit), conveying in series (bit-by-bit) the value of the weighting, coded by a fixed or variable number of bits. A digital coding is then used, and it can be binary or unary;

by digital connections (N wires, N bits), conveying in parallel the value of the weighting, coded on N bits. A digital coding is then used, and it can be binary or unary.

FIGS. 18 to 22 represent embodiments of the accumulation step 103 of FIG. 7.

Figure 18:
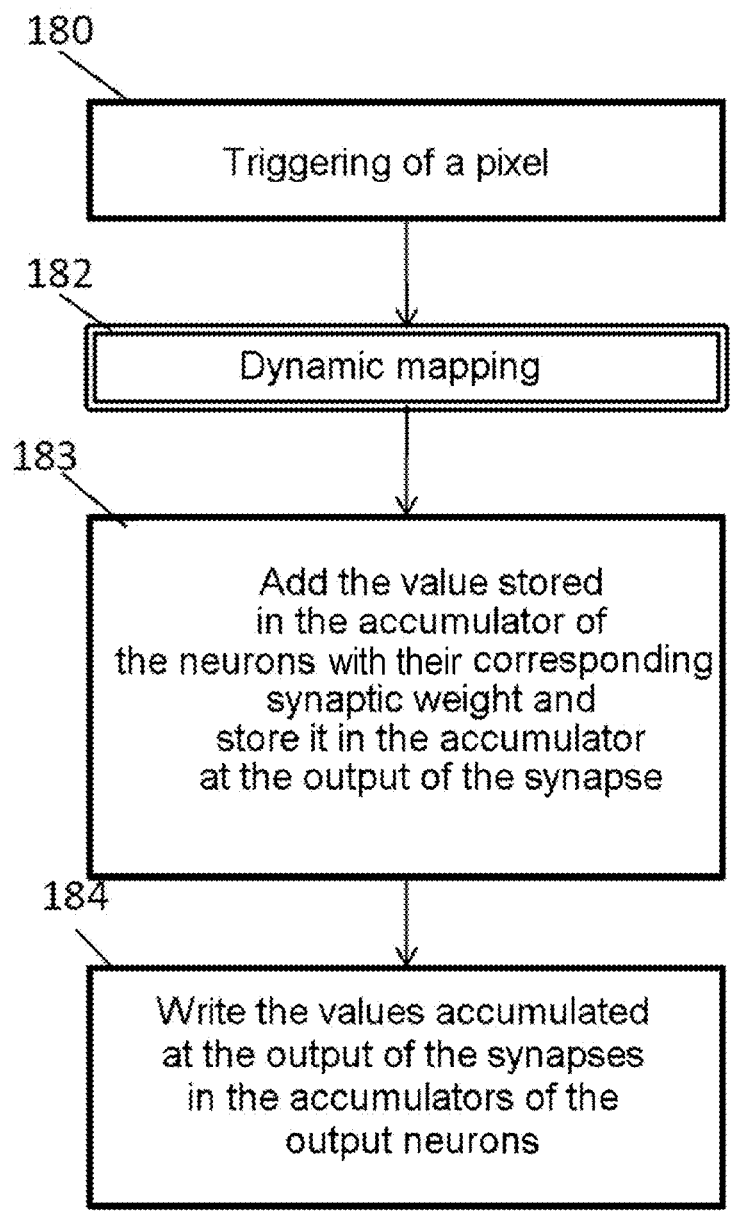
FIG. 18 is a flow diagram representing the accumulation step, according to a kernel-side embodiment.

More specifically, FIG. 18 is a flow diagram representing the accumulation step, according to a kernel-side embodiment.

In the step 180, an input neuron is triggered (pixel for example).

In the step 182, the dynamic mapping step is performed, for example according to one of the embodiments of FIGS. 12 to 17.

In the step 183, the value stored in the accumulator of each output neuron 140, located in the receptor field of the triggered neuron, is added with the corresponding synaptic weight to the input neuron (stored in at least one memristive device). The value thus obtained is stored in an accumulator 121 at the output of the synapse connecting the input neuron and the output neuron.

In the step 184, the accumulated output values of the synapses are written into the accumulators 140 of the output neurons.

Figure 19:
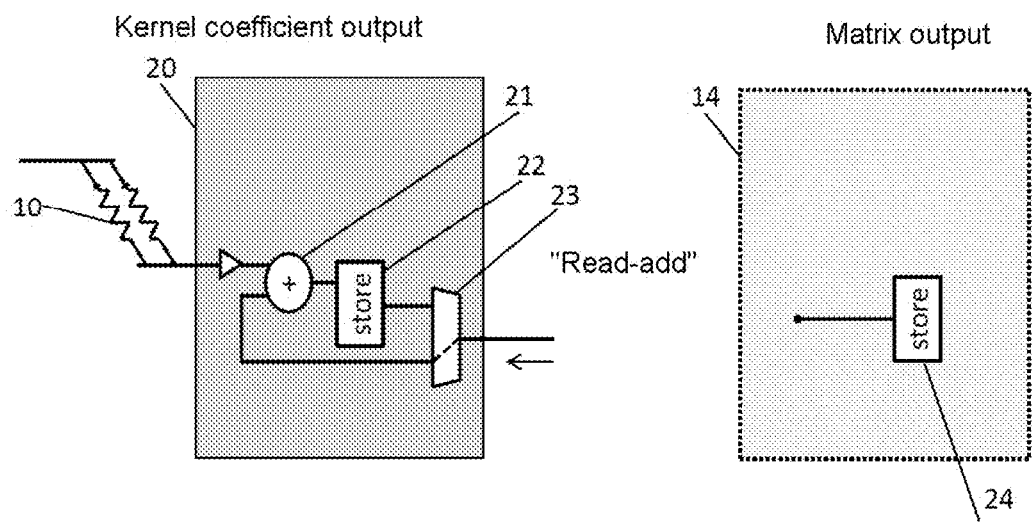
FIG. 19 represents an example of physical implementation of the accumulator in the kernel-side embodiment in write-add mode.

FIG. 19 represents an example of physical implementation of the accumulator 14 in the kernel-side embodiment in write-add mode.

Each output 20 of a coefficient of the convolution kernel can be physically implemented by a memristive device 10, an adder 21, a storage memory 22 and a switch 23.

The switch 23 is configured to switch between the read-add and write-back modes.

In read-add mode, each output 20 corresponding to a coefficient of the convolution kernel can be physically implemented by one or more memristive devices 10 storing the synaptic weight, the adder 21 then adding the value stored in the accumulator of each output neuron 140 with the weight stored in the memristive device(s). The output storage memory 22 of the synapse then stores the value thus obtained. The storage memory can be implemented analogically or digitally.

Figure 20:
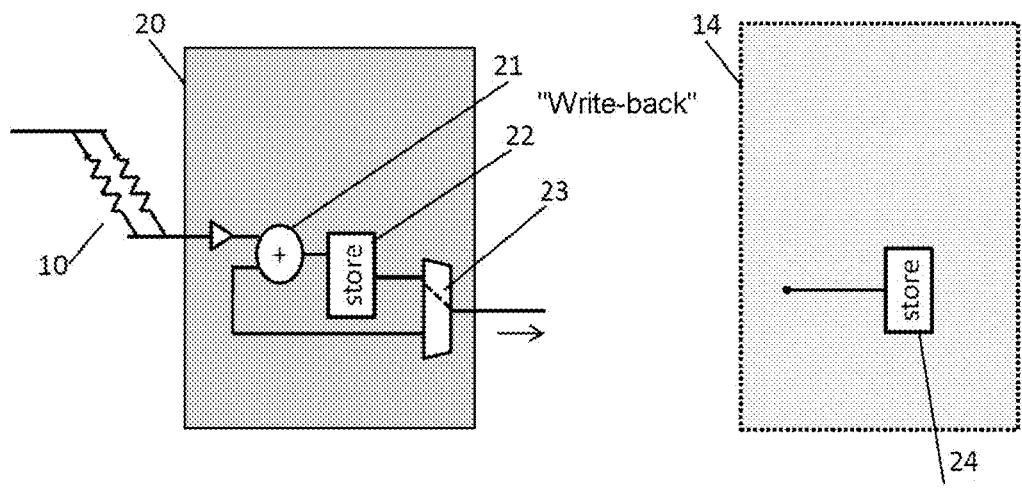
FIG. 20 represents the example of physical implementation of the accumulation part of FIG. 19 in write-back mode.

FIG. 20 represents the example of physical implementation of the accumulation part of FIG. 19 in write-back mode. Once the accumulation is performed for the group of the output neurons connected by the dynamic mapping, in the receptor field of the input neuron which was activated (i.e. triggered), the values accumulated in the accumulators 22 are propagated to the corresponding output neurons in the accumulators 140.

The matrix output 14 comprises a storage memory 24 for storing the propagated value deriving from the accumulators 22.

Figure 21:
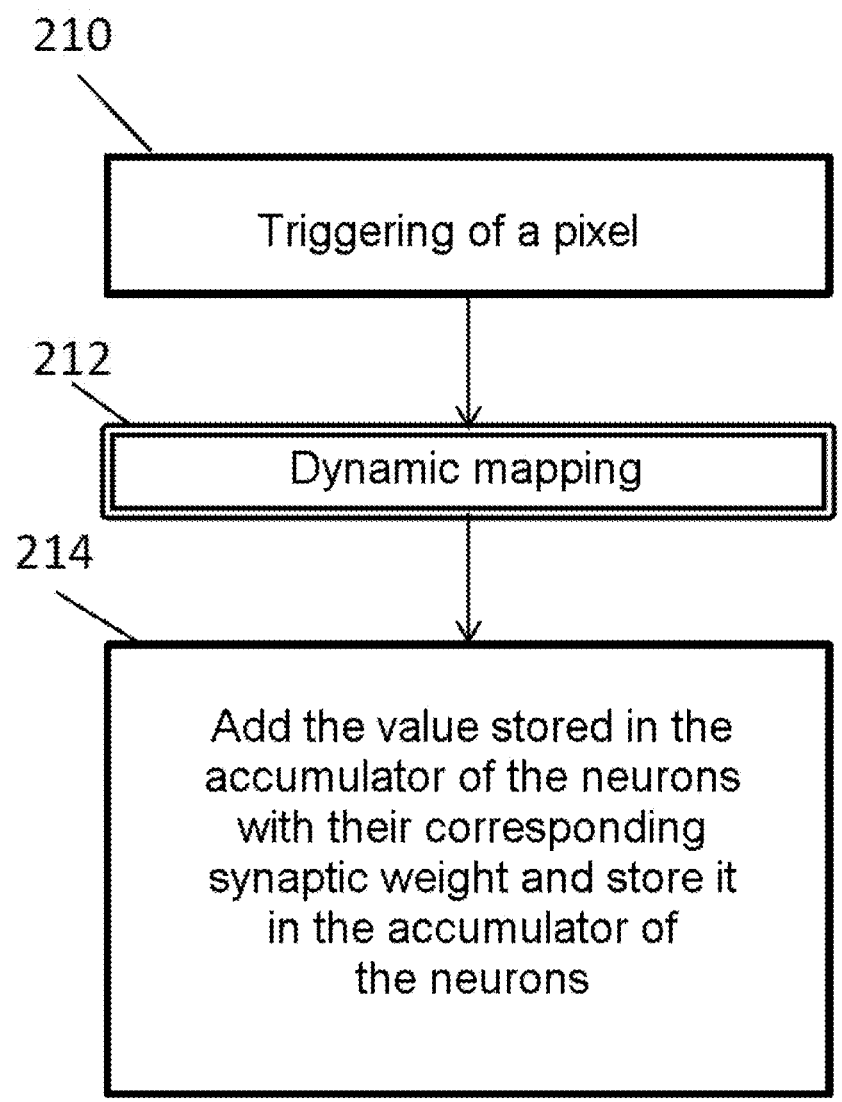
FIG. 21 is a flow diagram representing the accumulation step according to an embodiment of the output-side accumulation.

FIG. 21 is a flow diagram representing the accumulation step (step 103 of FIG. 7), according to an embodiment of the output-side accumulation.

In the step 210, an input neuron is triggered (pixel for example).

In the step 212, the dynamic mapping step is performed, for example according to one of the embodiments of FIGS. 12 to 17.

In the step 214, the value stored in the accumulator of each output neuron 140, located in the receptor field of the triggered neuron, is added with the corresponding synaptic weight to the input neuron (stored in at least one memristive device and previously propagated to the output matrix 14), on the side of the output matrix. The value thus obtained is directly stored in the output matrix 14.

Figure 22:
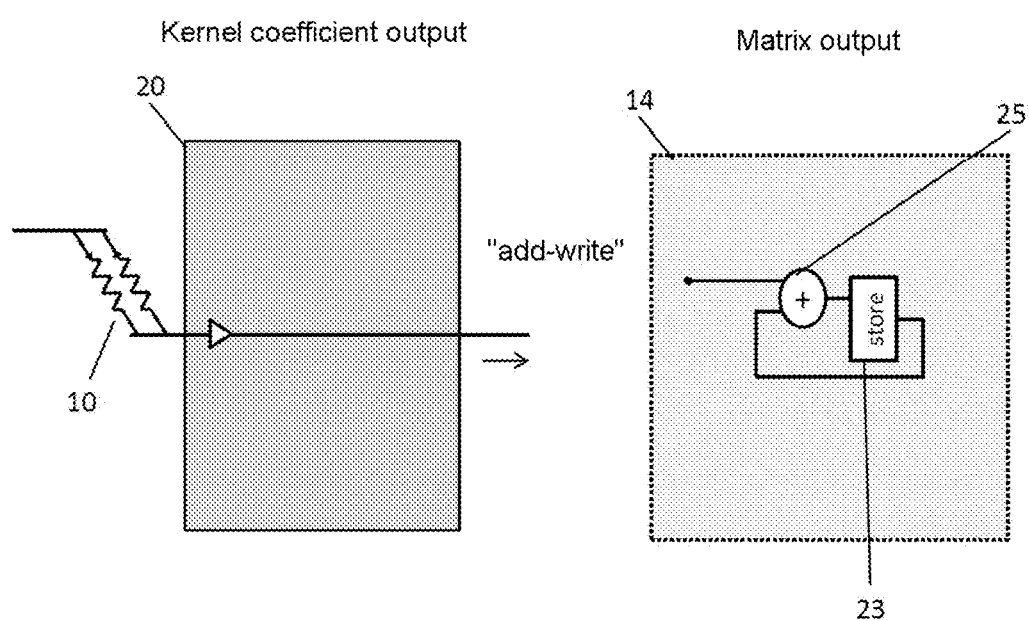
FIG. 22 represents an example of physical implementation of the accumulator in the embodiment of the output-side accumulation.

FIG. 22 represents an example of physical implementation of the accumulator 14 in the output-side embodiment.

Each output 20 of a coefficient of the convolution kernel is connected directly to the memristive device(s) 10 storing the value of the coefficient.

Each output of the matrix 14 can comprise an adder 25 and a storage memory 23.

Each output 20 of a coefficient of the convolution kernel can be physically implemented by the memristive device 10 storing the synaptic weight and propagated to the matrix 14. The adder 23 then directly adds the value stored in the accumulator of each output neuron 140 with the received weight. The storage memory 26 on the side of the output matrix stores the value thus obtained.

A person skilled in the art will understand that the convolution method according to the different embodiments can be implemented in different ways by hardware, software, or a combination of hardware and software elements.

The invention is not limited to the embodiments described above by way of nonlimiting example. It encompasses all the variant embodiments which will be able to be envisaged by those skilled in the art.

In particular, the dynamic mapping also applies to pooling layers for mapping the inputs with the output neurons involved in a pooling computation.

Moreover, the invention is not limited to a particular type of memristive device. For example, the memristive devices can be of CBRAM (Conductive bridging RAM), OXRAM (Oxide Based Resistive Memory), PCRAM (Phase change RAM) or PCM (Phase-Change Memory) type.

Furthermore, the invention is not limited to the applications described above and applies in particular to any type of audio, image, video or biological data classification application.

The invention claimed is:

1. A device implementing a convolutional neural network, said convolutional neural network comprising:
a plurality of artificial neurons arranged in one or more convolution layers, each convolution layer comprising one or more output matrices, each output matrix comprising a set of output neurons, each output matrix being connected to an input matrix, comprising a set of input neurons, by artificial synapses associated with a convolution matrix comprising weight coefficients associated with the output neurons of said output matrix, an output value of each output neuron being determined from the input neurons of said input matrix to which the output neuron is connected and the weight coefficients of the convolution matrix associated with said output matrix,
wherein said device comprises a set of memristive devices comprising at least one memristive device for implementing each synapse, each set of memristive devices storing a weight coefficient of said convolution matrix, and
wherein, in response to a change of the output value of an input neuron of an input matrix, the device is configured to dynamically map each set of memristive devices storing a weight coefficient of the convolution matrix to an output neuron connected to said input neuron using a dynamic routing, said dynamic mapping enabling connecting said each set of memristive devices to said output neuron,
the device further comprising, for each output neuron, at least one accumulator configured to accumulate the values of the weight coefficients stored in the sets of memristive devices dynamically mapped to said output neuron, the output value of said output neuron being determined from the value accumulated in said at least one accumulator, said accumulator comprising an adder for adding the value of the weight coefficient stored in the set of memristive devices dynamically mapped to said output neuron to a value stored in a memory comprised in said at least one accumulator, said added value being then stored in said memory, which provides said value accumulated in said at least one accumulator.

2. The device as claimed in claim 1, wherein the neurons use a time coding, the output value of the input neurons and of the output neurons being coded with spikes.

3. The device as claimed in claim 2, wherein a propagation of a value in the network is produced by propagation of at least one spike coding said value, according to said time coding.

4. The device as claimed in claim 3, further comprising:
an interconnexion matrix configured to perform dynamic mapping using address decoding.

5. The device as claimed in claim 4, wherein each spike comprises a bitstream coding the destination address of the spike according to two right-angled axes X and Y, the reference point corresponding to the reference point of the input matrix and wherein, in response to the arrival of said spike on the input matrix, said address is coded to represent the location of the input neuron to be activated.

6. The device as claimed in claim 1, wherein the dynamic mapping is produced in parallel and in a single cycle, by simultaneously connecting the weight coefficients of the convolution matrix stored in said sets of memristive devices to the output neurons connected to the input neuron having undergone a change of output value.

7. The device as claimed in claim 1, wherein the dynamic mapping is produced semi-sequentially, by connecting the weight coefficients of the convolution matrix stored in said memristive devices, one row of the matrix after the other, to the output neurons connected to the input neuron and having undergone a change of output value.

8. The device as claimed in claim 1, wherein the dynamic mapping is produced semi-sequentially, by connecting the weight coefficients of the convolution matrix stored in said memristive devices, one column of the matrix after the other, to the output neurons connected to the input neuron having undergone a change of output value.

9. The device as claimed in claim 1, wherein the dynamic mapping is produced sequentially, by connecting the coefficients of the convolution matrix, stored in said memristive devices, one after the other, to the output neurons connected to the input neuron having undergone a change of output value.

10. The device as claimed in claim 1, wherein said at least one accumulator comprises an accumulator arranged at each output neuron to store the value accumulated in said output neuron, and an auxiliary accumulator arranged at the output of each synapse, and wherein, in response to the dynamic mapping of a set of memristive devices implementing a synapse with an output neuron, the auxiliary accumulator arranged at the output of said synapse accumulates the value of the weight coefficient stored in said set of memristive devices with the value stored in the accumulator arranged at said output neuron, the value stored in said auxiliary accumulator being then propagated in the accumulator arranged at said output neuron.

11. The device as claimed in claim 1, wherein said at least one accumulator comprises an accumulator arranged at each output neuron to store the value accumulated in said output neuron, and wherein, in response to the dynamic mapping of a set of memristive devices with said output neuron, the weight coefficient of said set of memristive devices is propagated in said accumulator arranged at said output neuron, the value thus propagated then being accumulated with the value stored in said accumulator.

12. The device as claimed in claim 1, wherein the outputs of output neurons are grouped together, and wherein the accumulated values corresponding to output neurons whose outputs are grouped together are stored in a common accumulator.

13. The device as claimed in claim 1, comprising online learning of spike timing dependent plasticity (STDP) type from the dynamic mapping.

14. The device as claimed in claim 1, wherein the memristive devices are emulated by digital memory cells.

* * * * *